United States Patent
Kwak et al.

(10) Patent No.: US 10,756,866 B2
(45) Date of Patent: Aug. 25, 2020

(54) METHOD FOR TRANSMITTING UPLINK CONTROL CHANNEL IN WIRELESS COMMUNICATION SYSTEM AND APPARATUS FOR SAME

(71) Applicant: LG ELECTRONICS INC., Seoul (KR)

(72) Inventors: Kyuhwan Kwak, Seoul (KR); Suckchel Yang, Seoul (KR); Seonwook Kim, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 16/308,359

(22) PCT Filed: Jun. 12, 2017

(86) PCT No.: PCT/KR2017/006097
§ 371 (c)(1),
(2) Date: Dec. 7, 2018

(87) PCT Pub. No.: WO2017/213483
PCT Pub. Date: Dec. 14, 2017

(65) Prior Publication Data
US 2019/0132102 A1 May 2, 2019

Related U.S. Application Data

(60) Provisional application No. 62/420,703, filed on Nov. 11, 2016, provisional application No. 62/357,380, (Continued)

(51) Int. Cl.
H04W 72/04 (2009.01)
H04L 5/00 (2006.01)
H04L 27/26 (2006.01)

(52) U.S. Cl.
CPC .............. *H04L 5/0048* (2013.01); *H04L 5/00* (2013.01); *H04L 5/0007* (2013.01);
(Continued)

(58) Field of Classification Search
None
See application file for complete search history.

(56) References Cited

U.S. PATENT DOCUMENTS

2008/0298433 A1* 12/2008 Tiirola ................ H04L 27/2613
375/132
2014/0286255 A1* 9/2014 Nam ..................... H04L 1/1861
370/329

FOREIGN PATENT DOCUMENTS

KR 20160121321 A * 10/2016

OTHER PUBLICATIONS

PCT International Application No. PCT/KR2017/006097, International Search Report dated Oct. 17, 2017, 4 pages.
(Continued)

Primary Examiner — Kodzovi Acolatse
Assistant Examiner — The Hy Nguyen
(74) Attorney, Agent, or Firm — Lee, Hong, Degerman, Kang & Waimey PC

(57) ABSTRACT

Disclosed are a method for transmitting an uplink control channel in a wireless communication system and an apparatus for the same. Particularly, the method comprises the steps of: receiving allocation of a resource region including one or more symbols for transmission of an uplink control channel; and mapping uplink control information and a reference signal to each specific resource group unit in the allocated resource region, wherein the specific resource group unit may comprise a first resource element having the reference signal mapped thereto and second resource elements having the at least one piece of uplink control
(Continued)

information mapped thereto, the second resource elements may be arranged adjacent to the first resource element, and the second resource elements may be multiplexed according to orthogonal cover codes in a clockwise or counter-clockwise direction.

8 Claims, 21 Drawing Sheets

Related U.S. Application Data filed on Jul. 1, 2016, provisional application No. 62/357,378, filed on Jul. 1, 2016, provisional application No. 62/348,145, filed on Jun. 10, 2016.

(52) U.S. Cl.
CPC .......... *H04L 5/0051* (2013.01); *H04L 5/0053* (2013.01); *H04L 5/0092* (2013.01); *H04L 5/0094* (2013.01); *H04L 27/2602* (2013.01); *H04W 72/042* (2013.01)

(56) References Cited

OTHER PUBLICATIONS

ZTE, et al., "PUCCH design and evaluation for shortened TTI", R1-164640, 3GPP TSG RAN WG1 Meeting #85, May 2016, 12 pages.
LG Electronics, "Discussion on sPUCCH for HARQ-ACK in latency reduction", R1-164545, 3GPP TSG RAN WG1 Meeting #85, May 2016, 8 pages.
Sharp, "Channel design of shortened PUCCH", R1-165001, 3GPP TSG RAN WG1 Meeting #85, May 2016, 3 pages.

* cited by examiner

FIG. 3
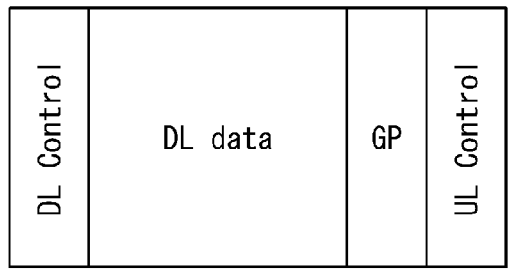
(a)
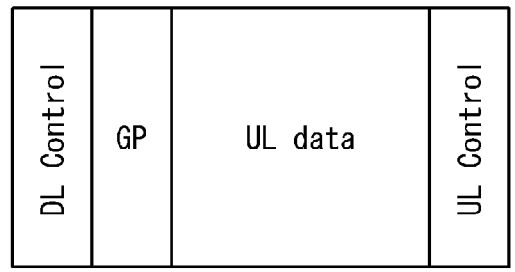
(b)
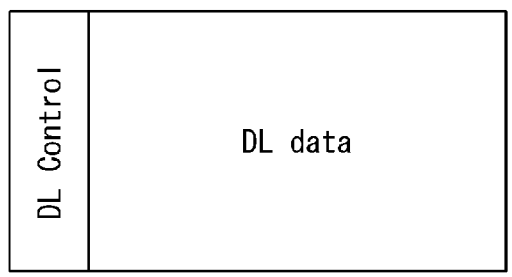
(c)
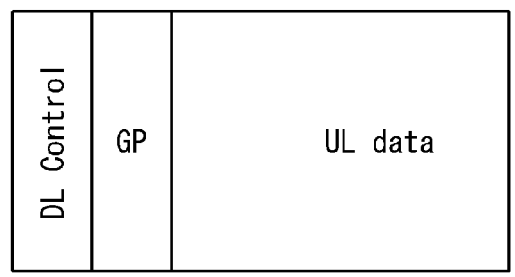
(d)
FIG. 4
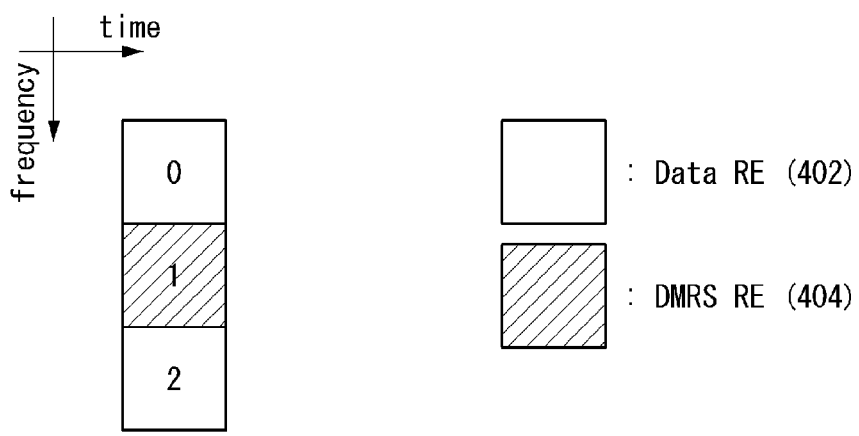

FIG. 12
(a)
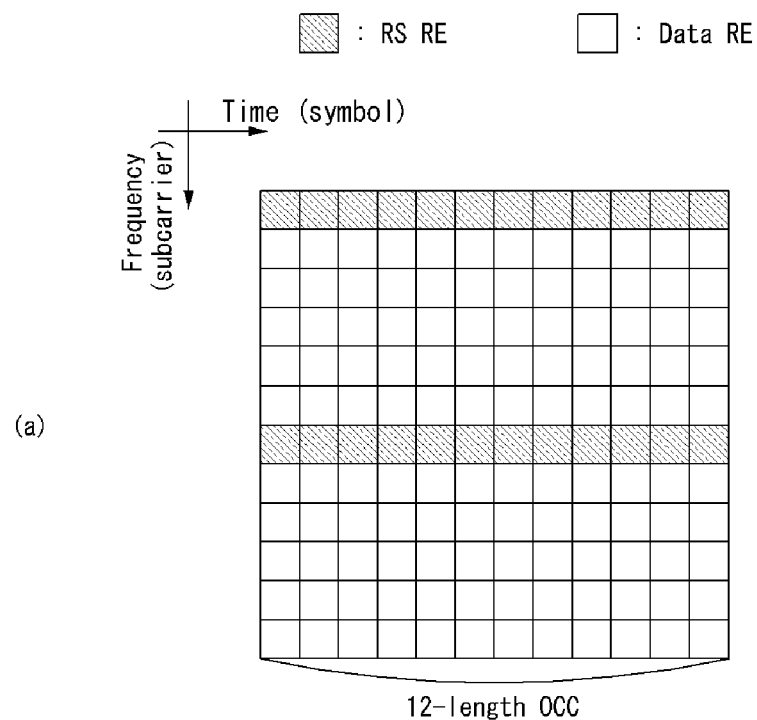
12-length OCC
(b)
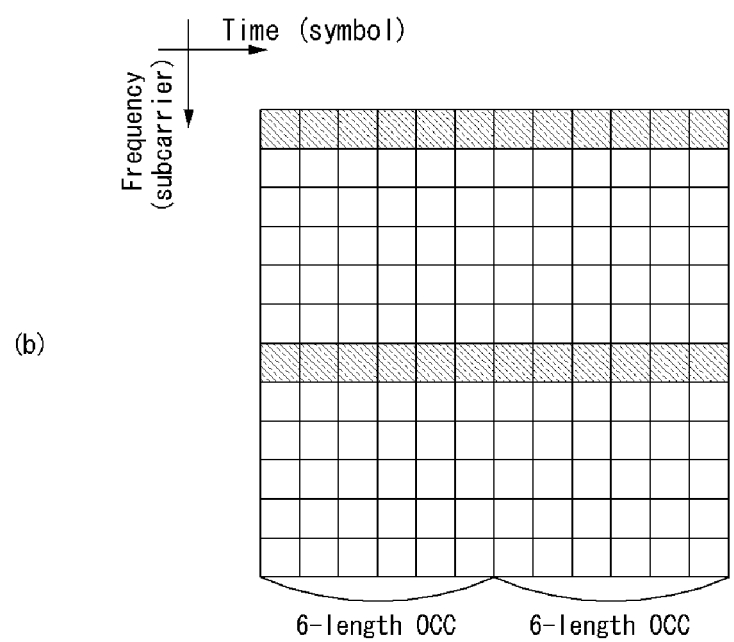
6-length OCC    6-length OCC FIG. 16
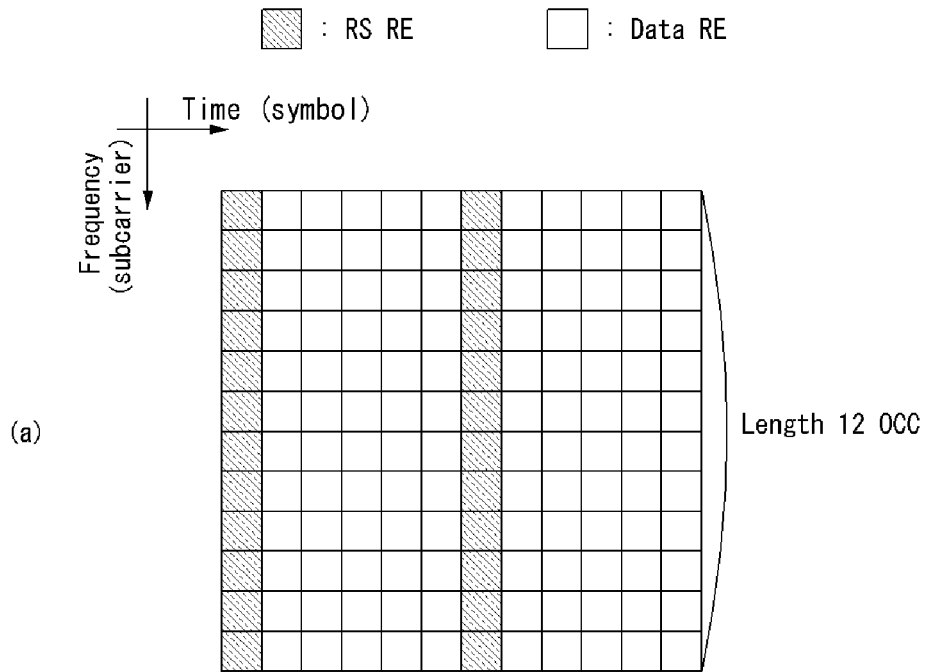
(a)
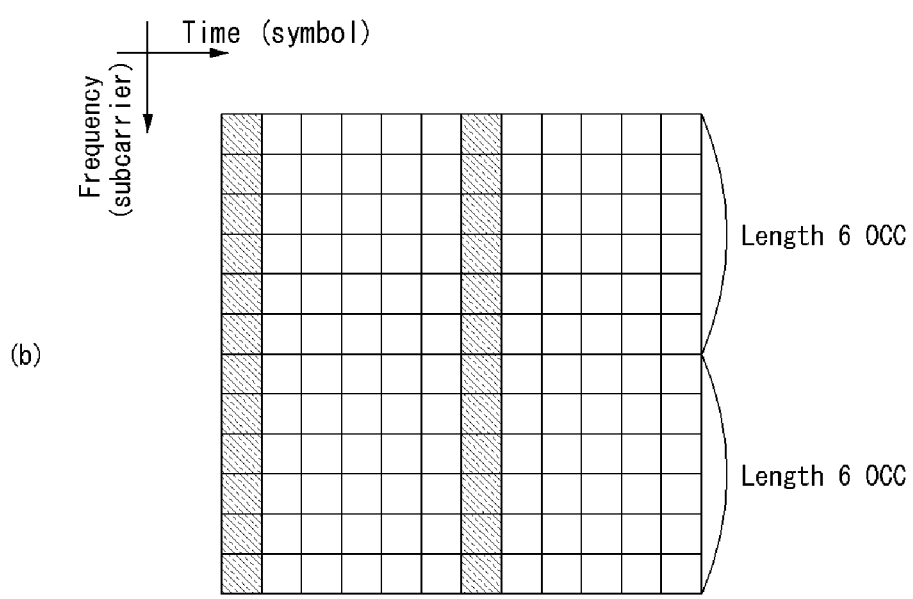
(b)

METHOD FOR TRANSMITTING UPLINK CONTROL CHANNEL IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2017/006097, filed on Jun. 12, 2017, which claims the benefit of U.S. Provisional Application No. 62/348,145, filed on Jun. 10, 2016, 62/357,378, filed on Jul. 1, 2016, 62/357,380, filed on Jul. 1, 2016 and 62/420,703, filed on Nov. 11, 2016, the contents of which are all hereby incorporated by reference herein in their entirety.

TECHNICAL FIELD

The present invention relates to a wireless communication system and, more particularly, to a method for transmitting an uplink control channel and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

This specification proposes a method of configuring an uplink control channel transmitted from a user equipment to a base station in a wireless communication system.

More specifically, this specification proposes a method of configuring an uplink control channel of 1 symbol unit and an uplink control channel of a plurality of symbol units.

Furthermore, this specification proposes a method of adaptively configuring a resource unit (e.g., resource element group (REG)) for transmitting an uplink control channel based on the time/frequency selectivity degree of a user equipment.

Furthermore, this specification proposes a method of applying an orthogonal cover code for multiplexing to resource elements configuring an uplink control channel region. In particular, this specification proposes a method of applying each orthogonal cover code to a resource element(s) to which a reference signal (e.g., DMRS) related to an uplink control channel is mapped and resource elements to which uplink control information is mapped.

Technical objects to be achieved by the present invention are not limited to the aforementioned technical objects, and other technical objects not described above may be evidently understood by a person having ordinary skill in the art to which the present invention pertains from the following description.

Technical Solution

A method for a user equipment to transmit an uplink control channel in a wireless communication system according to an embodiment of the present invention includes receiving allocation of a resource region configured with one or more symbols for a transmission of an uplink control channel and mapping uplink control information and a reference signal to the allocated resource region in a specific resource group unit, wherein the specific resource group unit includes a first resource element to which the reference signal is mapped and second resource elements to which at least one of the uplink control information is mapped, wherein the second resource elements are located contiguously to the first resource element, and wherein the second resource elements are multiplexed clockwise or counter-clockwise based on an orthogonal cover code.

Furthermore, in an embodiment of the present invention, the first resource element may include one of one or more resource elements allocated for a transmission of a reference signal for the uplink control channel in the allocated resource region, and wherein each of the one or more resource elements may be located based on at least one of a specific symbol interval or a specific subcarrier spacing preconfigured between resource elements.

Furthermore, in an embodiment of the present invention, the one or more resource elements may be configured with one or more resource element sets based on a length of an orthogonal cover code applied to the one or more resource elements.

Furthermore, in an embodiment of the present invention, the uplink control information may be mapped to at least one of the second resource elements.

Furthermore, in an embodiment of the present invention, the orthogonal cover code may be applied using a specific resource element of the second resource elements as a starting point.

Furthermore, in an embodiment of the present invention, the method may further include receiving, from a base station, information indicating the specific resource element via at least one of higher layer signaling or downlink control information.

Furthermore, in an embodiment of the present invention, the length of the orthogonal cover code may be determined based on the number of second resource elements.

Furthermore, in an embodiment of the present invention, if a pair of a subcarrier index and symbol index of the first resource element is (k, l), pairs of subcarrier indices and symbol indices of the second resource elements may be configured as (k−1, l−1), (k−1, l), (k−1, l+1), (k, l−1), (k, l+1), (k+1, l−1), (k+1, l), and (k+1, l+1).

In a user equipment transmitting an uplink control channel in a wireless communication system according to another embodiment of the present invention, the user equipment includes a transceiver unit for transmitting and receiving radio signals and a processor functionally connected to the transceiver unit, wherein the processor controls to receive allocation of a resource region configured with one or more symbols for a transmission of an uplink control channel and map uplink control information and a reference signal to the allocated resource region in a specific resource group unit, wherein the specific resource group unit includes a first resource element to which the reference signal is mapped and second resource elements to which at least one of the uplink control information is mapped, wherein the second resource elements are located contiguously to the first resource element, and wherein the second resource elements are multiplexed clockwise or counter-clockwise based on an orthogonal cover code.

Advantageous Effects

In accordance with an embodiment of the present invention, the transmission of an uplink control channel can be optimized because a base station can configure the unit of a resource element group used for the transmission of the uplink control channel for each user equipment (i.e., adaptive transmission unit configuration).

Furthermore, in accordance with an embodiment of the present invention, the limited resource region of an uplink control channel can be efficiently used because a base station performs adaptive resource allocation for each user equipment.

Furthermore, in accordance with an embodiment of the present invention, a user equipment having low coverage can perform efficient uplink control channel transmission because an uplink control channel region is configured in several symbols.

Furthermore, in accordance with an embodiment of the present invention, if a plurality of user equipments is present, efficient uplink transmission can be performed in terms of the amount of data because the ratio of a reference signal resource element (RS RE) allocated to an uplink control channel region is lowered.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 3 illustrates examples of a self-contained subframe structure to which a method proposed in this specification may be applied.

FIG. 4 illustrates an example of a resource element group (REG) to which a method proposed in this specification may be applied.

FIG. 12 illustrates examples in which an orthogonal cover code (OCC) is applied to an uplink control region to which a method proposed in this specification may be applied.

FIG. 16 illustrates other examples in which an orthogonal cover code (OCC) is applied to an uplink control region to which a method proposed in this specification may be applied.

MODE FOR INVENTION

Figure 1:
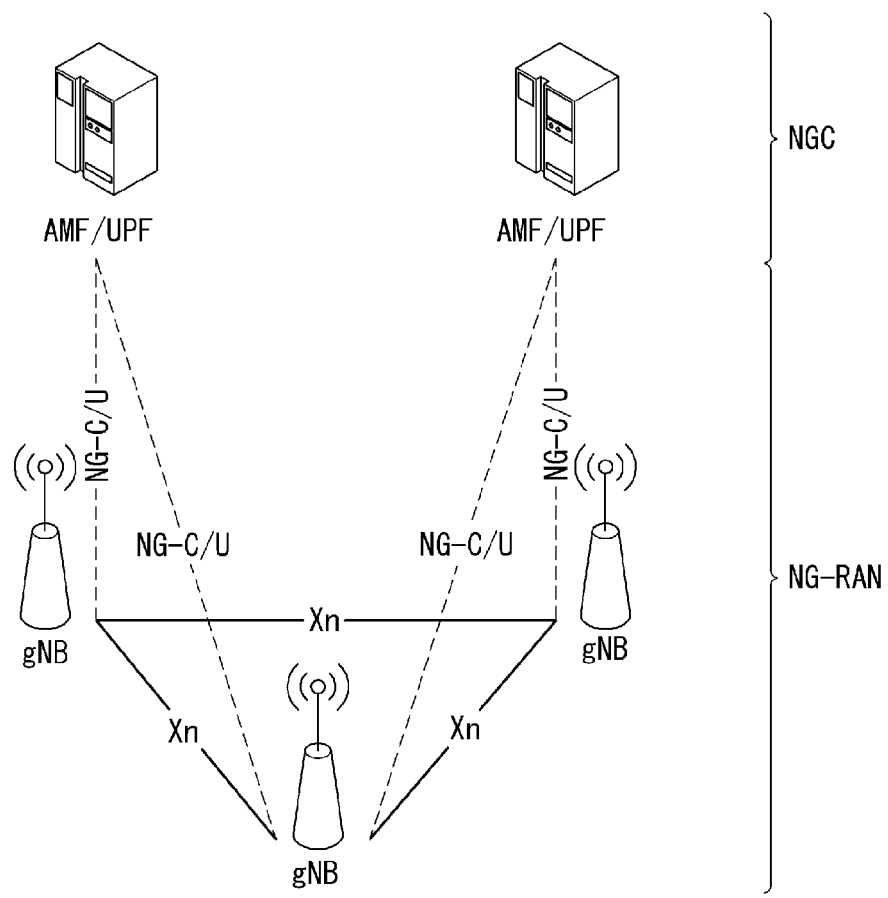
FIG. 1 is a diagram showing an example of a general system configuration of a new RAT (NR) to which a method proposed in this specification may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/New RAT (NR) is primarily described for clear description, but technical features of the present invention are not limited thereto.

As the supply of smartphones and Internet of Things (IoT) UEs is rapidly spread, the amount of information exchanged over a communication network is explosively increased. Accordingly, in a next-generation radio access technology, an environment (e.g., enhanced mobile broadband communication) that provides users with faster services than the existing communication system (or existing radio access technology) may need to be taken into consideration. To this end, the design of a communication system in which machine type communication (MTC) providing services by connecting multiple devices and objects is also taken into consideration.

Furthermore, the design of a communication system (e.g., ultra-reliable and low latency communication URLLC) in which reliability of communication and/or service and/or a terminal, etc. sensitive to latency is taken into consideration is also discussed.

In the following specification, for convenience of description, a next-generation radio access technology is referred to as a new RAT (NR, radio access technology). A wireless communication system to which the NR is applied is referred to as an NR system.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a user equipment (UE).

The gNBs are connected to each other via an Xn interface.

The gNBs are also connected to an NGC via an NG interface.

More specifically, the gNBs are connected to an access and mobility management function (AMF) via an N2 interface and a user plane function (UPF) via an N3 interface.

New Rat (NR) Numerologies and Frame Structure

In the NR, a plurality of numerologies is supported. The numerology is defined by a subcarrier spacing and CP overhead. A plurality of subcarrier spacings may be derived by scaling a basic subcarrier spacing by an integer N. A numerology used may be selected independently of a frequency band although it is assumed that a very low subcarrier spacing is not used in a very high carrier frequency. In this case, a flexible network and a UE channel bandwidth are supported.

In the RAN1 spec. viewpoint, a maximum channel bandwidth per NR carrier is 400 MHz. In the case of at least one numerology, the candidates of a maximum subcarrier number per NR carrier are 3300 or 6600 in the RAN1 spec. viewpoint.

Subframe duration is fixed to 1 ms, and a frame length is 10 ms. A scalable numerology needs to permit a subcarrier spacing of at least 15 kHz-480 kHz. All numerologies having a great subcarrier spacing of 15 kHz or more regardless of CP overhead are arranged in a symbol boundary for each 1 ms of an NR carrier.

More specifically, normal CP series are selected as follows.

If a subcarrier spacing is 15 kHz*$2^n$ (n is an integer not a negative number), Each symbol length (including a CP) of the 15 kHz subcarrier spacing is identical with the sum of corresponding $2^n$ symbols of a scaled subcarrier spacing.

In each 0.5 ms, all OFDM symbols within 0.5 ms have the same size in addition to the first OFDM symbol.

The first OFDM symbol within 0.5 ms is 16 Ts (assuming 15 kHz and an FFT size of 2048) longer than other OFDM symbols.

16 Ts are used in a CP for the first symbol.

If a subcarrier spacing is 15 kHz*$2^n$ (n is a negative integer)

Each symbol length (including a CP) of the subcarrier spacing is the same as the sum of corresponding $2^n$ symbols of 15 kHz.

A resource defined by one subcarrier and one symbol is called a resource element (RE).

A physical layer design supports an extended CP. The extended CP is only one in a given subcarrier spacing. An LTE-scaled extended CP is supported in at least 60 kHz subcarrier spacing. A CP type may be semi-statically configured using UE-specific signaling. A UE supporting an extended CP may depend on a UE type/capability.

The number of subcarriers per PRB is 12. An explicit DC subcarrier is not reserved for both the downlink and uplink. Regarding a DC present within a transmitter, DC processing of a DC subcarrier on the transmitter side is regulated as follows.

A receiver is aware of where a DC subcarrier is placed or whether the location of a DC subcarrier is notified (e.g., by spec. or signaling) or aware of whether a DC subcarrier is not present within a receiver bandwidth.

In the case of the downlink, a UE may assume that a DC subcarrier transmitted by the transmitter (gNB) side has been modulated. That is, data is not rate-matched or punctured.

In the case of the uplink, a DC subcarrier transmitted by the transmitter (UE) side is modulated. That is, data is not rate-matched or punctured.

In the case of the uplink, the transmitter DC subcarrier of the transmitter (UE) side needs to avoid a collision against at least DMRS.

At least one specific subcarrier needs to be defined as the candidate location of a DC subcarrier with respect to the uplink. For example, the DC subcarrier is positioned at the boundary of a PRB.

In the case of the uplink, means for allowing a receiver to determine a DC subcarrier position needs to be designated.

This is associated with a DC subcarrier position written in semi-static signaling from a UE and the standard.

If a DC subcarrier is not present, all subcarriers within a receiver bandwidth are transmitted.

In contrast, on the receiver side, special handling of a DC subcarrier has not been regulated in RAN1 on the receiver side. An operation needs to be implemented. That is, for example, the receiver may puncture data received in a DC subcarrier.

A slot is defined as 7 or 14 OFDM symbols with respect to the same subcarrier spacing up to 60 kHz having a normal CP and as 14 OFDM symbols at the same subcarrier spacing higher than 60 kHz having a normal CP.

A slot may include all downlinks, all uplinks or at least one downlink portion and at least one uplink portion. A slot set is supported. That is, data transmission may be scheduled as one or a plurality of slot spacings.

Furthermore, a mini-slot having the following length is defined.

A mini-slot having at least 6 GHz or more, length 1 symbol is supported.

Lengths from a length 2 to a slot length −1

In the case of URLLC, at least two are supported.

When a slot level channel/signal/procedure is designed, the followings need to be considered.

The possible occurrence of a mini-slot/slot transmission (s) that occupies resources scheduled for the on-going slot transmission(s) of a given carrier with respect to the same/different UEs At least one of DMRS formats/structures/configurations for a slot level data channel is reused for a mini-slot level data channel.

At least one of DL control channel formats/structures/configurations for slot level data scheduling is designed to be applied to mini-slot level data scheduling.

At least one of UL control channel formats/structures/configurations for slot level UCI feedback is designed to be applied to mini-slot level UCI feedback.

The following use case for designing a mini-slot is considered.

Support of a very low latency time including an URLLC with respect to a specific slot length.

A target slot length is at least 1 ms, 0.5 ms.

In particular, if a TXRP uses beam-sweeping (e.g., 6 GHz or more), a finer TDM granularity for the same or different UE within a slot is supported.

NR-LTE co-existence

Forward compatibility for an unlicensed spectrum operation.

Self-Contained Subframe Structure

A time division duplexing (TDD) structure considered in an NR system is a structure in which both uplink (UL) and downlink (DL) are processed in one subframe. This is for minimizing latency of data transmission in the TDD system, and the structure is called a self-contained subframe structure.

Figure 2:
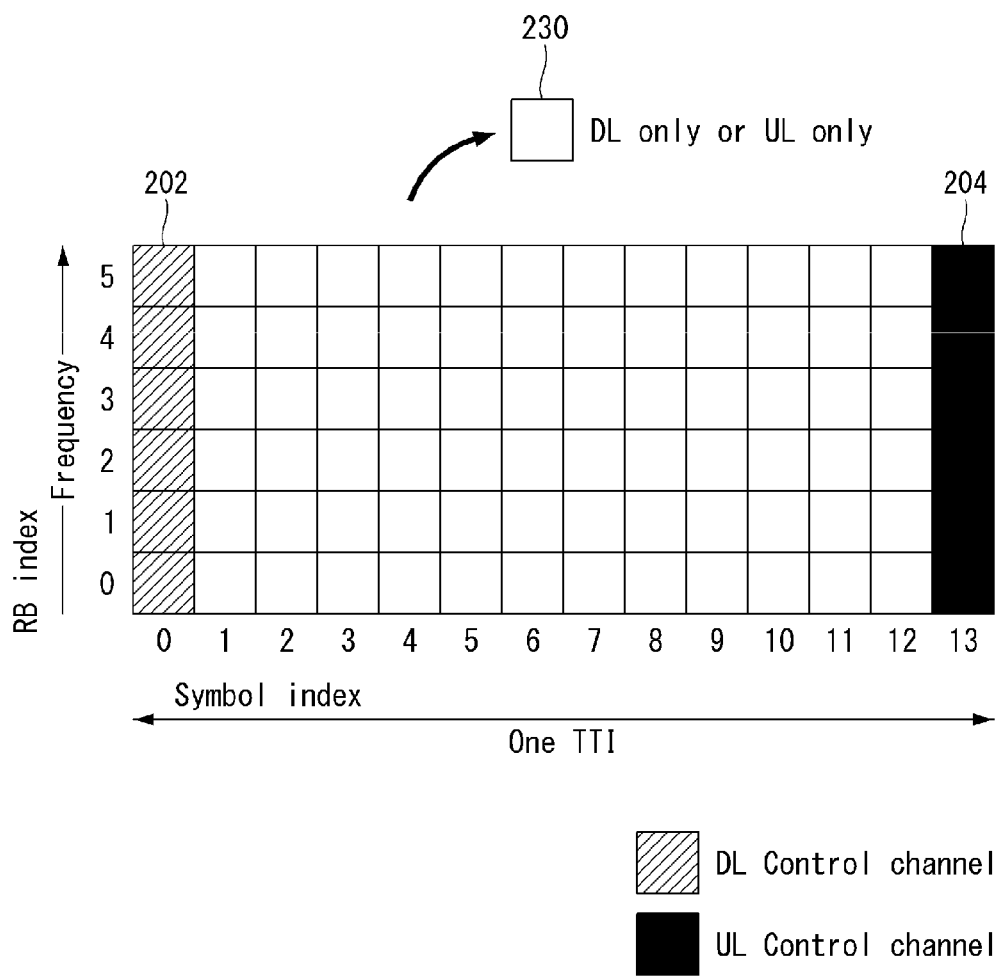
FIG. 2 illustrates an example of a self-contained subframe structure to which a method proposed in this specification may be applied.

FIG. 2 illustrates an example of a self-contained subframe structure to which the method proposed by the present invention may be applied. FIG. 2 is only for convenience of description and does not limit the scope of the present invention.

Referring to FIG. 2, as in the case of legacy LTE, a case where one subframe includes 14 orthogonal frequency division multiplexing (OFDM) symbols is assumed.

In FIG. 2, a region 202 means a downlink control region, and a region 204 means an uplink control region. Furthermore, a region (i.e., region not having separate indication) other than the region 202 and the region 204 may be used for the transmission of downlink data or uplink data.

That is, uplink control information and downlink control information are transmitted in one self-contained subframe. In contrast, in the case of data, uplink data or downlink data is transmitted in one self-contained subframe.

If the structure shown in FIG. 2 is used, downlink transmission and uplink transmission are sequentially performed and the transmission of downlink data and the reception of uplink ACK/NACK may be performed within one self-contained subframe.

As a result, when an error in data transmission occurs, the time taken up to the retransmission of data can be reduced. Accordingly, latency related to data delivery can be minimized.

In a self-contained subframe structure such as FIG. 2, there is a need for a time gap for a process for a base station (eNodeB, eNB, gNB) and/or a terminal (user equipment (UE)) to switch from a transmission mode to a reception mode or from the reception mode to the transmission mode. In relation to the time gap, if uplink transmission is performed after downlink transmission in the self-contained subframe, some OFDM symbol(s) may be configured as a guard period (GP).

Uplink Control Channel

Physical uplink control signaling should be able to at least carry hybrid-ARQ acknowledgment, CSI report (including beamforming information if possible), and a scheduling request.

At least two transmission methods are supported for the UL control channel supported by the NR system.

The uplink control channel may be transmitted around a last transmitted uplink symbol(s) of a slot in short duration. In this case, the uplink control channel is time-division-multiplexed and/or frequency-division-multiplexed with an uplink (UL) data channel in the slot. One-symbol unit transmission of the slot is supported with respect to the uplink control channel of the short duration.

Short uplink control information (UCI) and data are frequency-division-multiplexed at least between the UE and the UE in the case where the physical resource blocks (PRBs) for the short UCI and the data do not overlap.

In order to support time division multiplexing (TDM) of short PUCCH from different UEs in the same slot, a mechanism for notifying to the UE whether the symbol(s) in the slot to transmit the short PUCCH is supported at least at 6 GHz or more is supported.

With respect to 1-symbol duration, supported at least are 1) that when a reference signal (RS) is multiplexed, the UCI and the RS is multiplexed to a given OFDM symbol by a frequency division multiplexing (FDM) scheme and 2) that subcarrier spacings between downlink (DL) and uplink (UL) data and the short duration PUCCH are the same as each other in the same slot.

At least, the short duration PUCCH during 2-symbol duration is supported. In this case, the subcarrier spacings between the downlink (DL) and uplink (UL) data and the short duration PUCCH are the same as each other in the same slot.

At least, a semi-static configuration is supported, in which a PUCCH resource of the UE given in the slot, that is, short PUCCHs of different UEs may be time-division-multiplexed within given duration.

The PUCCH resource includes a time domain and a frequency domain and if applicable, the PUCCH resource includes a code domain.

The short duration PUCCH may be extended to the end of the slot from the viewpoint of the UE. In this case, after the short duration PUCCH, an explicit gap symbol is not required.

In regard to a slot (that is, a DL-centric slot) having a short UL part, when data is scheduled in a short uplink part, 'short UCI' and data may be frequency-division-multiplexed by one UE.

The uplink control channel may be transmitted over multiple uplink symbols during long duration in order to improve coverage. In this case, the uplink control channel is frequency-division-multiplexed with the uplink data channel in the slot.

At least, a UCI carried by a long duration UL control channel may be transmitted in one slot or multiple slots by a design with a low peak to average power ratio (PAPR).

Transmission using multiple slots is allowed for a total duration (e.g., 1 ms) in at least some cases.

For the long duration uplink control channel, time division multiplexing (TDM) between the RS and the UCI is supported with respect to DFT-S-OFDM.

The long UL part of the slot may be used for transmitting the long duration PUCCH. That is, the long duration PUCCH is supported with respect to both a UL-only slot and a slot having symbols of a variable number constituted by a minimum of four symbols.

At least with respect to a 1 or 2-bit UCI, the UCI may be repeated in N (N>1) slots and the N slots may be adjacent or not adjacent in slots in which the long duration PUCCH is allowed.

At least, simultaneously transmission of the PUSCH and the PUCCH is supported with respect to a long PUCCH. That is, even when there is data, the uplink control for the PUCCH resource is transmitted. Further, in addition to the simultaneous transmission of the PUCCH and the PUSCH, the UCI in the PUSCH is supported.

Intra-TTI slot frequency hopping is supported.

A DFT-s-OFDM waveform is supported.

A transmit antenna diversity is supported.

TDM and FDM between the short duration PUCCH and the long duration PUCCH are supported for other UEs in at least one slot. In the frequency domain, the PRB (or multiple PRBs) is the minimum resource unit size for the UL control channel. When hopping is used, frequency resources and hopping may not spread to a carrier bandwidth. Further, a UE-specific RS is used for NR-PUCCH transmission. A set of PUCCH resources is configured by higher layer signaling and the PUCCH resources within the configured set is indicated by downlink control information (DCI).

As part of the DCI, the timing between data reception and hybrid-ARQ acknowledgment transmission should be dynamically (at least together with RRC) indicated. A combination of the semi-static configuration and dynamic signaling (for at least some types of UCI information) is used to determine the PUCCH resource for 'long and short PUCCH formats'. Here, the PUCCH resource includes the time domain and the frequency domain and, if applicable, the PUCCH resource includes the code domain. Using UCI on the PUSCH, that is, a part of the scheduled resource for the UCI is supported in the case of simultaneous transmission of the UCI and the data.

Further, at least a single HARQ-ACK bit uplink transmission is supported at least. In addition, a mechanism is supported, which enables the frequency diversity. Further, in the case of Ultra-Reliable and Low-Latency Communication (URLLC), a time interval between scheduling (SR) resources configured for the UE may be smaller than one slot.

x-Physical Uplink Control Channel (PUCCH) Format (1) Physical uplink control channel (xPUCCH)

The physical uplink control channel, i.e., xPUCCH, carries the uplink control information. The xPUCCH may be transmitted in a last symbol of the subframe.

All xPUCCH formats adopts cyclic shift and $n_{cs}^{cell}(n_s)$. Here, the cyclic shift is changed by slot number $n_s$. The cyclic shift is defined according to Equation 1.

$$n_{cs}^{cell}(n_s) = \sum_{n=0}^{7} c(8N_{symb}^{UL} \cdot \bar{n}_s + i) \cdot 2^i \quad \text{[Equation 1]}$$

$$\bar{n}_s = n_s \bmod 20$$

In Equation 1, c(i) denotes the pseudo-random sequence and a pseudo-random sequence generator is initialized by $c_{init} = n_{ID}^{RS}$.

The physical uplink control channel supports multiple formats as shown in Table 1.

TABLE 1

| xPUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 96 |

(2) xPUCCH formats 1, 1a, and 1b

For xPUCCH format 1, information is carried by presence/absence of the transmission of the xPUCCH from the UE. For xPUCCH format 1, d (0)=1 is assumed.

For each of xPUCCH formats 1a and 1b, one or two explicit bits are transmitted. Blocks $b(0), \ldots, b(M_{bit}-1)$ of bits are modulated as described in Table 2, resulting in a complex-valued symbol d(0). Modulation schemes for other xPUCCH formats are given in Table 2.

TABLE 2

| PUCCH format | $b(0), \ldots, b(M_{bit} - 1)$ | d(0) |
|---|---|---|
| 1a | 0 | 1 |
|  | 1 | −1 |
| 1b | 00 | 1 |
|  | 01 | −j |
|  | 10 | j |
|  | 11 | −1 |

The complex-valued symbol d(0) is multiplexed into a sequence of cyclically shifted lengths $N_{seq}^{PUCCH}=48$ for each of P antenna ports used for xPUCCH transmission according to Equation 2.

$$y^{(\tilde{p})}(n) = \frac{1}{\sqrt{P}} d(0) \cdot r_{u,v}^{\alpha_{\tilde{p}}}(n), \quad \text{[Equation 2]}$$

$$n = 0, 1, \ldots, N_{seq}^{PUCCH} - 1$$

In Equation 2, $r_{u,v}^{(\alpha_{\tilde{p}})}(n)$ is defined as $M_{sc}^{RS}=N_{seq}^{PUCCH}$ and an antenna port specific cyclic shift is defined as shown in Equation 3.

$$\alpha_{\tilde{p}}(n_s) = 2\pi \cdot n_{cs}^{(\tilde{p})}(n_s) / N_{sc}^{RB} \quad \text{[Equation 3]}$$

$$n_{cs}^{(\tilde{p})}(n_s) = \left[ n_{cs}^{cell}(n_s) + n_{CS}^{xPUCCH,1} + \frac{N_{sc}^{RB} \tilde{p}}{P} \right] \bmod N_{sc}^{RB}$$

$$\tilde{p} \in \{0, 1, \ldots, P-1\}$$

In Equation 3, $n_{CS}^{xPUCCH} \in \{0,2,3,4,6,8,9,10\}$ is configured by higher layers.

The block y of the complex-valued symbols is mapped to z according to Equation 4.

$$z^{(\tilde{p})}(n_{xPUCCH}^{(1)} \cdot N_{xPUCCH}^{RB} \cdot N_{sc}^{RB} + m' \cdot N_{sc}^{RB} + k') = y^{(\tilde{p})}(8 \cdot m' + k) \quad \text{[Equation 4]}$$

In Equation 4, k', m', and $N_{xPUCCH}^{RB}$ are as shown in Equation 5.

$$k' = \begin{cases} k & 0 \le k \le 1 \\ k+2 & 2 \le k \le 5 \\ k+4 & 6 \le k \le 7 \end{cases} \quad \text{[Equation 5]}$$

$$m' = 0, 1, 2, \ldots, 5$$

$$N_{xPUCCH}^{RB} = 6$$

The resources used for transmission of the xPUCCH formats 1, 1a, and 1b are identified by a resource index $N_{xPUCCH}^{(1)}$, and $n_{xPUCCH}^{(1)}$ is configured by the higher layers and indicated on the x-Physical Downlink Control Channel (xPDCCH).

(3) xPUCCH Format 2

The block $b(0), \ldots, b(M_{bit}-1)$ of bits are scrambled by a UE-specific scrambling sequence, resulting in a block $\tilde{b}(0), \ldots, \tilde{b}(M_{bit}-1)$ of scrambled bits according to Equation 6.

$$\tilde{b}(i) = (b(i) + c(i)) \bmod 2 \quad \text{[Equation 6]}$$

In Equation 6, c(i) denotes the pseudo-random sequence and the pseudo-random sequence generator is initialized at the beginning of each subframe by $c_{init} = (\lfloor \bar{n}_s/2 \rfloor + 1) \cdot (2N_{ID}^{cell}+1) \cdot 2^{16} + n_{RNTI}$. Here, $\bar{n}_s = n_s \bmod 20$ and $n_{RNTI}$ denotes a Cell Radio Network Temporary Identifier (C-RNTI).

The scrambled blocks $\tilde{b}(0), \ldots, \tilde{b}(M_{bit}-1)$ of bits are Quadrature Phase-Shift Keying (QPSK) modulated, resulting in blocks $d(0), \ldots, d(M_{symb}-1)$ of the complex-valued modulation symbols. Here, $M_{symb}$ is $M_{bit}/2$.

1) Layer Mapping

The complex-valued modulation symbols to be transmitted are mapped to one or two layers. The complex-valued modulation symbols $d(0), \ldots, d(M_{symb}-1)$ are mapped to the layers $x(i) = [x^{(0)}(i) \ldots x^{(\upsilon-1)}(i)]^T$. Here, $i = 0, 1, \ldots, M_{symb}^{layer}-1$, $\upsilon$ denotes the number of layers, and $M_{symb}^{layer}$ denotes the number of modulation symbols per layer.

For transmission at a single antenna port, a single layer is used (i.e., V=1) and the mapping is defined according to Equation 7. In this case, $M_{symb}^{layer}$ and $M_{symb}^{(0)}$.

$$x^{(0)}(i) = d(i) \quad \text{[Equation 7]}$$

For transmission at two antenna ports, a mapping rule of two layers may be defined according to Equation 8. In this case, $M_{symb}^{layer}$ is $M_{symb}^{(0)}/2$.

$$x^{(0)}(i) = d(2i)$$

$$x^{(1)}(i) = d(2i+1) \quad \text{[Equation 8]}$$

2) Precoding

A precoder takes a block $[x^{(0)}(i) \ldots x^{(\upsilon-1)}(i)]^T$ (here, $i=0, 1, \ldots, M_{symb}^{layer}-1$) of vectors as an input from the layer mapping and generates a block $[y^{(0)}(i) \ldots y^{(P-1)}(i)]^T$ (here, $i=0, 1, \ldots, M_{symb}^{ap}-1$) of vectors to be mapped to the resource elements.

For the transmission at the single antenna port, precoding is defined by Equation 9. In this case, $i=0, 1, \ldots, M_{symb}^{ap}-1$ and $M_{symb}^{ap}$ is $M_{symb}^{layer}$.

$$y^{(0)}(i)=x^{(0)}(i) \quad \text{[Equation 9]}$$

For the transmission at two antenna ports $\tilde{p} \in \{0,1\}$, an output $y(i)=[y^{(0)}(i)\ y^{(1)}(i)]^T$ of a precoding operation (here, $i=0, 1, \ldots, M_{symb}^{ap}-1$) is defined by Equation 10. In this case, $i=0, 1, \ldots, M_{symb}^{layer}-1$ and $M_{symb}^{ap}$ is $2M_{symb}^{layer}$.

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} \quad \text{[Equation 10]}$$

The mapping to the resource elements is defined by the operation in quadruplets of the complex-valued symbols. When $w^{(\tilde{p})}(i) = \langle y^{(\tilde{p})}(4i), y^{(\tilde{p})}(4i+1), y^{(\tilde{p})}(4i+2), y^{(\tilde{p})}(4i+3) \rangle$ means a symbol quadruplet i for an antenna port $\tilde{p}$, a block $w^{(\tilde{p})}(0), \ldots, w^{(\tilde{p})}(M_{quad}-1)$ (here, $M_{quad}=M_{symb}/4$) of the quadruplets is cyclically shifted, resulting in $\overline{w}^{(\tilde{p})}(0), \ldots, \overline{w}^{(\tilde{p})}(M_{quad}-1)$ (Here, $M_{quad}=M_{symb}/4$). Here, $\overline{w}^{(\tilde{p})}(i) = w^{(\tilde{p})}((i+n_{cs}^{cell}(n_s)) \bmod M_{quad})$.

For xPUCCH format 2, the block of the complex-valued symbols is mapped to z according to Equation 11.

$$z^{(\tilde{p})}(n_{xPUCCH}^{(2)} \cdot N_{xPUCCH}^{RB} \cdot N_{sc}^{RB} + m' \cdot N_{sc}^{RB} + k') = \overline{w}^{(\tilde{p})}(8m'+k) \quad \text{[Equation 11]}$$

In Equation 10, k' and m' are as shown in Equation 12.

$$k' = \begin{cases} k & 0 \le k \le 1 \\ k+2 & 2 \le k \le 5 \\ k+4 & 6 \le k \le 7 \end{cases} \quad \text{Equation 12]}$$

$$m' = 0, 1, 2, \ldots, 5$$

Further, $n_{xPUCCH}^{(2)}$ is configured by the higher layers and indicated in the xPDCCH.

In the case of an NR system, in order to minimize the latency of control information and/or data transmission, a self-contained subframe structure and/or a stricture in which a transmission time interval (TTI) is shortly configured (i.e., short TTI structure) may be considered. Accordingly, a system can be configured more flexibly.

In this case, in the case of structures (e.g., self-contained subframe structure and short TTI structure), such as those described above, an uplink channel for carrying uplink control information may be configured to be transmitted in 1 symbol. Alternatively, a method of configuring an uplink control channel in several symbols by considering coverage of a UE may also be considered.

Hereinafter, this specification proposes methods of configuring an uplink control channel region which may be considered in an NR system, that is, 1) a method of configuring an uplink control channel region of 1 symbol unit and 2) a method of configuring an uplink control channel region of a plurality of symbol units.

Furthermore, the following embodiments have been classified for convenience of description, and some configuration or characteristic of an embodiment may be included in another embodiment or may be replaced with a corresponding configuration or characteristic of another embodiment. For example, methods of applying an orthogonal cover code described in a second embodiment may be hereinafter applied to a structure described in a first embodiment. For another example, methods of applying a resource element group (REG) described in the first embodiment may be hereinafter applied to a structure described in the second embodiment.

First Embodiment—Uplink Control Channel Region of 1 Symbol Unit

As described above, if an uplink control channel is configured in 1 symbol unit, in order for a UE to map uplink information to the uplink control channel, a resource element group (REG) including resource elements (REs) of a repeatable minimum unit may be considered. In other words, an REG may be considered as a basic unit for enabling a UE to transmit uplink control information.

In this case, the REG may be configured in various ways based on a type (or kind), number and/or assignment method of an RE.

FIG. 4 illustrates an example of a resource element group (REG) to which a method proposed in this specification may be applied. FIG. 4 is for only convenience of description and does not limit the scope of the present invention.

Referring to FIG. 4, the REG may include three REs. Two of the three REs may include data REs 402, and the remaining one may include a DMRS RE 404. That is, if an REG includes three REs, uplink control information may be mapped to two REs, and a reference signal (RS) may be mapped to the remaining one RE.

In this case, an uplink control channel may be configured through the repetition of the REG. The number of REs and/or the ratio (i.e., configuration) of a data RE and a DMRS RE configuring an REG unit may vary based on channel delay spread based on the mobility of a UE (or user). Furthermore, in the case of a method proposed in the present invention, an REG unit is determined based on a UE-specific reference signal (e.g., a demodulated reference signal (DMRS)) not a cell-specific reference signal (e.g., cell-specific reference signal (CRS)), so the REG unit may be configured differently for each UE. Accordingly, each UE can use an REG unit optimized therefor, and can perform optimized uplink control information transmission.

Furthermore, the number of REs and/or the ratio of a data RE and a DMRS RE configuring an REG unit may be configured in various ways based on the capability of a UE reported to a base station. Furthermore, the ratio of a data RE and a DMRS RE configuring an REG unit may be differently configured based on the type (or kind) of uplink control information.

In this case, a configuration related to the REG unit may be previously defined on a system. Alternatively, a base station may deliver information the configuration to a UE through higher layer signaling and/or downlink control information (DCI).

Furthermore, in relation to the REG, the number of REs and/or the ratio of a data RE and a DMRS RE configuring an REG may be determined based on the size of a resource block (RB) predefined in a system.

In this case, uplink control information (UCI) may be fully mapped to a single REG or to a plurality of REGs. If uplink control information is mapped to a plurality of REGs, the plurality of mapped REGs may be considered as a single REG set.

If a resource allocated to a UE is a plurality of RBs, the plurality of RBs may be configured by repeating a single REG unit to which the entire uplink control information has been mapped. Alternatively, the uplink control information may be mapped all REGs configuring a plurality of RBs. That is, if the size of a plurality of RBs and the size of an REG set allocated to a UE are the same, uplink control information may be mapped to all REGs configuring the plurality of RB. Alternatively, if uplink control information is mapped to a plurality of REGs, that is, an REG set, a plurality of RBs may be configured by repeating the corresponding REG set. Alternatively, a single REG to which uplink control information has been mapped, that is, a single REG may be configured to a plurality of RBs.

If uplink control information is mapped to a plurality of REGs (i.e., REG set), the plurality of corresponding REGs may be configured based on a localized mapping method or a distributed mapping method. Furthermore, although a plurality of REG sets configure one control channel element (CCE) or control channel (CCH), the plurality of REG sets may be configured according to the localized mapping method or distributed mapping method.

In this case, a method of mapping uplink control information to an REG(s) may be determined based on the size (i.e., payload size) of the uplink control information. In other words, uplink information may be fully mapped to a single REG or may be mapped to a plurality of REGs based on the size of the uplink control information. For example, if the size of uplink control information is a specific number of bits (e.g., X bits) or less, the uplink control information may be configured to be fully mapped to a single REG. In this case, the specific number of bits may be derived based on the number of REs configuring a single REG and/or a modulation method.

Furthermore, as described above, an REG may be located contiguously to a different REG, and the neighbor REGs may be configured as another REG unit, that is, an REG set. Furthermore, an orthogonal cover code (OCC) may be applied to the REG and/or the REG set, so code division multiplexing (CDM) may be performed. Alternatively, REGs may be distributed and located to a frequency band in an REG unit and/or an REG set unit without code division multiplexing.

In this case, whether code division multiplexing will be applied, the number of REGs and/or a bandwidth in which REGs are distributed and located may be differently configured based on a degree (or level) of time/frequency selectivity and/or a network condition based on the mobility of a UE. Furthermore, the interval between REGs may be configured to be the same interval and/or different intervals. For example, if REGs are distributed and transmitted at the same interval, an REG may be located at a position corresponding to the index of a specific multiple based on the index of a first transmission resource.

Figure 5:
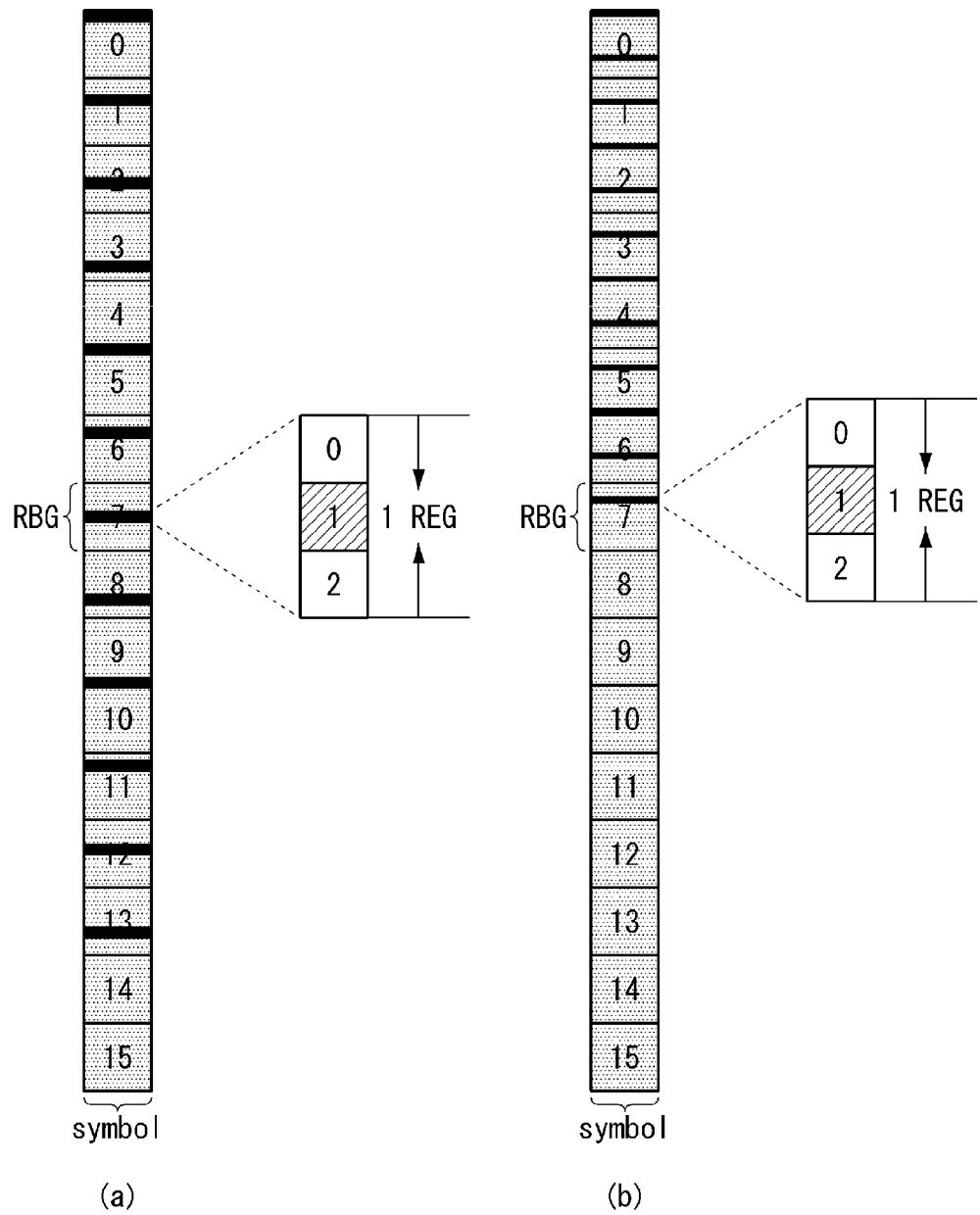
FIG. 5 illustrates examples in which REG units to which a method proposed in this specification may be applied are subjected to distributed transmission on a frequency region.

In this case, as in FIG. 5, REG units may be distributed and transmitted in a full band or some bands on a frequency region.

FIG. 5 illustrates examples in which REG units to which a method proposed in this specification may be applied are subjected to distributed transmission on a frequency region. FIG. 5 is for only convenience of description and does not limit the scope of the present invention.

Referring to FIG. 5, a case where an REG unit includes two data REs and one DMRS RE and the interval (i.e., offset) between REG units is regularly maintained with respect to each example is assumed.

FIG. 5(a) illustrates a case where REG units are distributed and transmitted in a full band on a frequency region.

FIG. 5(b) illustrates a case where REG units are distributed and transmitted in some bands (i.e., a specific band) on a frequency region.

In this case, a base station may notify a UE of configuration information indicating whether the REG units are transmitted in a full band or transmitted in some bands and/or information about the interval between the REG units through higher layer signaling and/or downlink control information.

Furthermore, if the REG units are transmitted in some bands, the some bands may be configured in plural number. Accordingly, REGs may be distributed and transmitted in a plurality of some bands within a full band.

Figure 6:
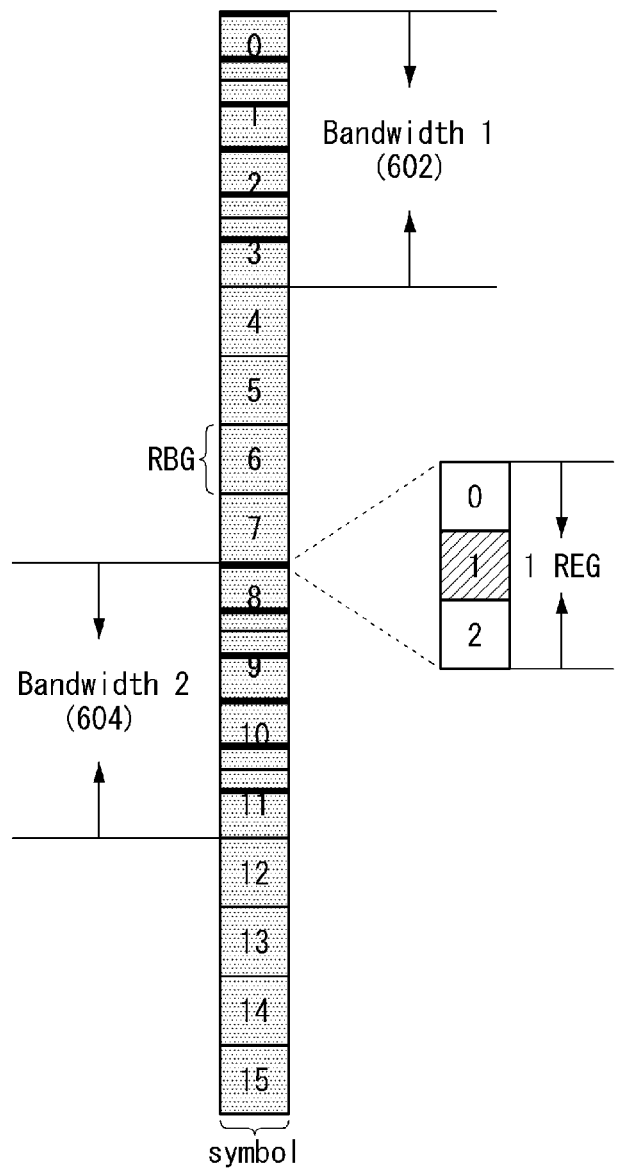
FIG. 6 illustrates another example in which REG units to which a method proposed in this specification may be applied are subjected to distributed transmission on a frequency region.

FIG. 6 illustrates another example in which REG units to which a method proposed in this specification may be applied are subjected to distributed transmission on a frequency region. FIG. 6 is for only convenience of description and does not limit the scope of the present invention.

Referring to FIG. 6, a case where an REG unit includes two data REs and one DMRS RE and the interval between REG units (i.e., offset (offset)) is regularly maintained is assumed.

As shown in FIG. 6, the REG units may be distributed and located to a first bandwidth (Bandwidth 1) 602 and a second bandwidth (Bandwidth 2) 604. Accordingly, a UE may transmit uplink control information only in specific bands of a supported full band in an REG unit.

In this case, a base station may transmit configuration information (i.e., configuration information in which the REG units are mapped to specific bands), such as that described above, to the UE through higher layer signaling and/or downlink control information (DCI).

In this case, a method of applying an orthogonal division code within the above-described REG unit (i.e., to the REG unit) may be considered as follows.

Figure 7:
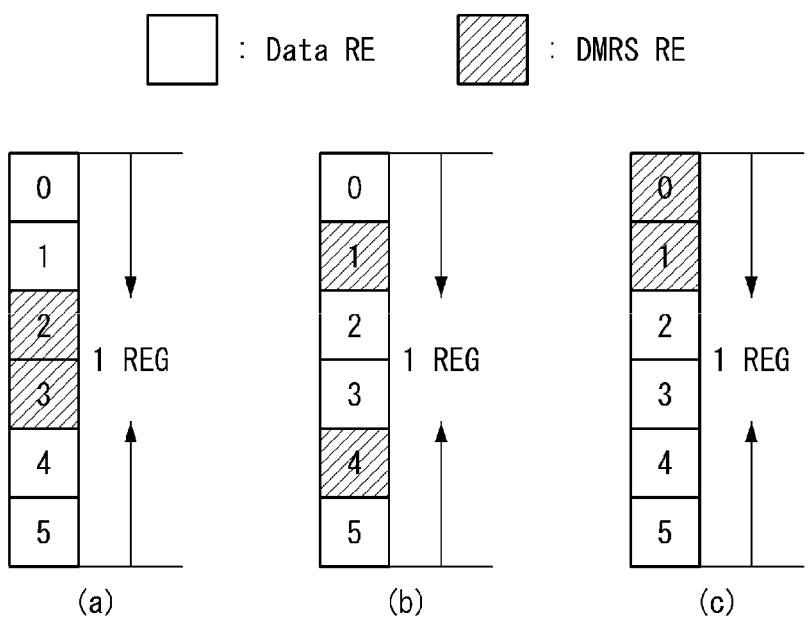
FIG. 7 illustrates examples of an REG unit according to an RE assignment to which a method proposed in this specification may be applied.

FIG. 7 illustrates examples of an REG unit according to an RE assignment to which a method proposed in this specification may be applied. FIG. 7 is for only convenience of description and does not limit the scope of the present invention.

Referring to FIG. 7, a case where an REG unit include four data REs and two DMRS REs is assumed. In this case, the assignment of REs configuring the REG unit may be differently configured based on a degree (or level) of time/frequency selectivity based on the mobility of a UE. That is, the assignment of data REs and DMRS REs may be different as in FIGS. 7(a), 7(b), and 7(c) based on a degree of time/frequency selectivity.

In this case, a maximum of two REs may be multiplexed by applying an orthogonal cover code of a length 4 (4-length OCC) to four data REs and applying an orthogonal cover code of a length 2 (2-length OCC) to two DMRS REs.

In this case, configuration information about the assignment of REs configuring the REG unit may be previously defined on a system. Alternatively, a base station may adaptively configure the assignment of REs according to circumstances, and may transmit (or notify) the corresponding configuration information to a UE through higher layer signaling and/or downlink control information.

Furthermore, in relation to a transmission unit, a UE may distribute and transmit a plurality of REGs or may configure an aggregation level in two or more connected REG units and may distribute and transmit an aggregated REG. For example, the aggregation level may be configured as a first aggregated REG including two REGs, a second aggregated REG including three REGs, etc. In this case, the aggregated REG may mean the above-described REG set (REG set). In this case, the length of the aggregated REG unit may be set based on the length of a sequence applied to the transmission of uplink control information.

Figure 8:
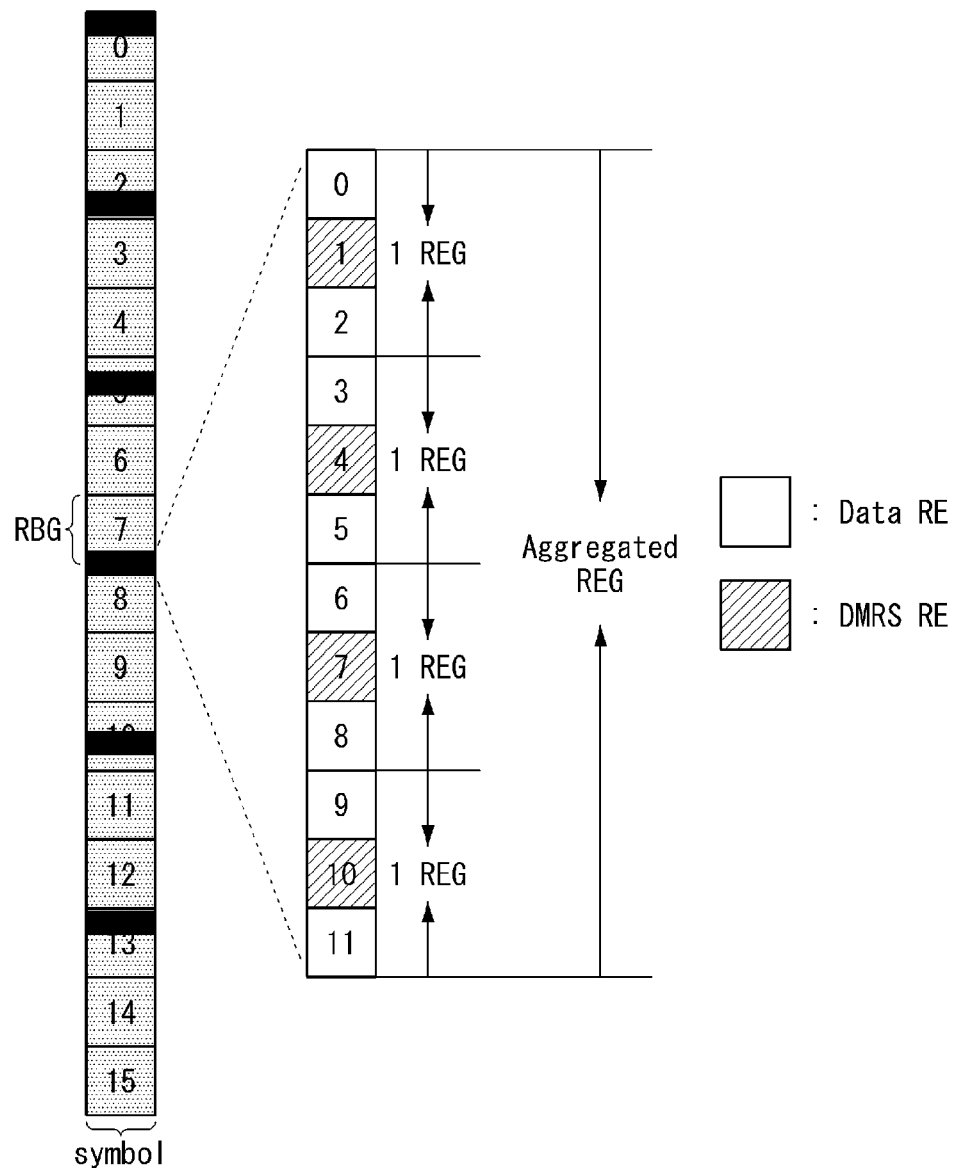
FIG. 8 illustrates an example of a method of distributing and transmitting aggregated REG units to which a method proposed in this specification may be applied.

FIG. 8 illustrates an example of a method of distributing and transmitting aggregated REG units to which a method proposed in this specification may be applied. FIG. 8 is for only convenience of description and does not limit the scope of the present invention.

Referring to FIG. 8, a case where an aggregated REG unit includes four REG units and each REG unit includes three REs is assumed. That is, a case where the aggregated REG unit includes 12 REs (four DMRS REs and eight data REs) is assumed.

In this case, the number of REG units (i.e., aggregation level) configuring the aggregated REG unit may be differently set based on a degree (or level) of time/frequency selectivity and/or a network condition (e.g., the number of UEs connected to a network) based on the mobility of a UE.

In this case, a base station may transmit (or notify) configuration information about the number of REG units, configuring an aggregated REG unit, to a UE through higher layer signaling and/or downlink control information.

Furthermore, a sequence may be applied to an aggregated REG unit including a plurality of REGs. Such a sequence may be a sequence in which the PAPR has a low characteristic. In this case, there are advantages in that multiplexing between UEs can be performed through code division multiplexing (CDM) and the PAPR can be lowered compared to a case where an orthogonal cover code is used. To this end, the assignment of a DMRS RE and a data RE may be configured like FIG. 9.

Figure 9:
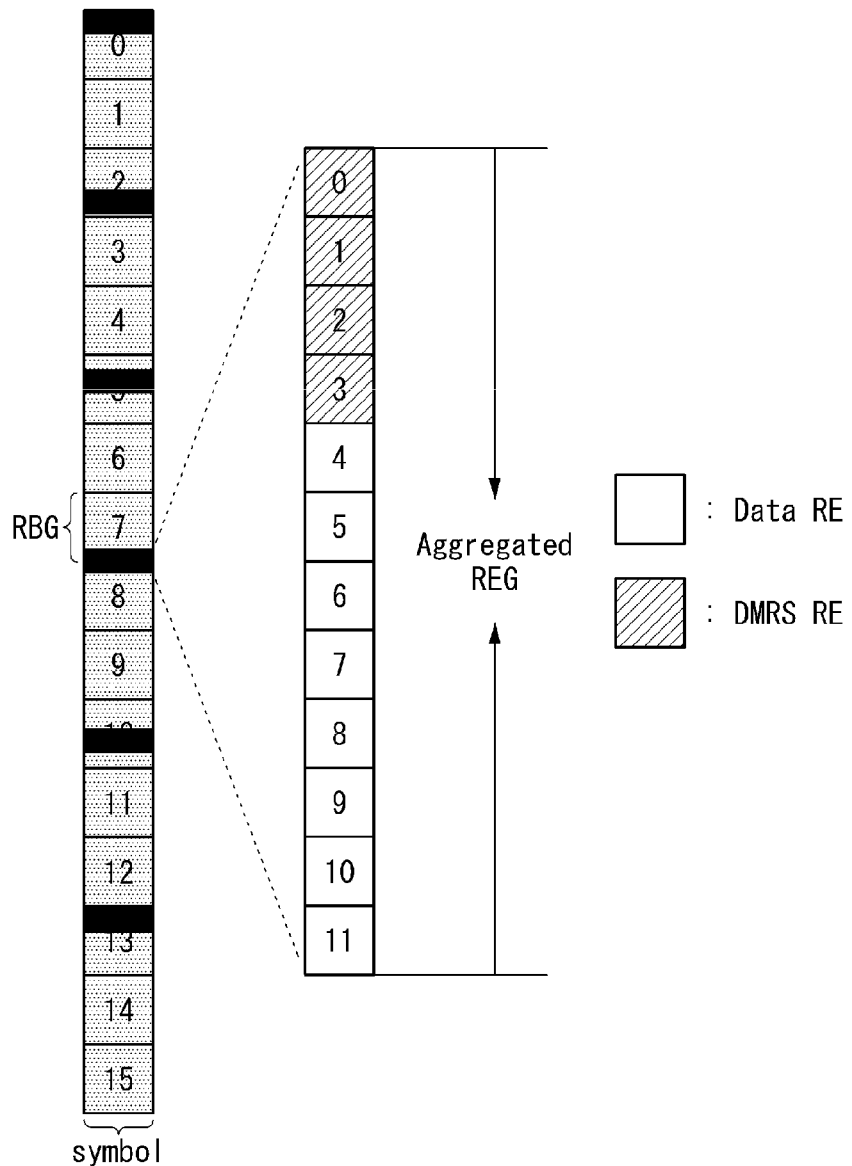
FIG. 9 illustrates another example of a method of distributing and transmitting aggregated REG units to which a method proposed in this specification may be applied.

FIG. 9 illustrates another example of a method of distributing and transmitting aggregated REG units to which a method proposed in this specification may be applied. FIG. 9 is for only convenience of description and does not limit the scope of the present invention.

Referring to FIG. 9, a case where an aggregated REG unit includes 12 REs and the 12 REs include four neighbor DMRS REs and eight neighbor data REs is assumed. In this case, the ratio of the DMRS REs and data REs configuring the aggregated REG unit may be changed. For example, the ratio may be differently set based on a degree (or level) of time/frequency selectivity and/or a condition (e.g., the number of UEs connected to a network) of the network based on the mobility of a UE.

Furthermore, in this case, the ratio of the DMRS REs and the data REs and the assignment of REs in the aggregated REG may be previously defined on a system based on the above-described aggregation level. Alternatively, a base station may (adaptively) configure the ratio and the assignment of REs according to circumstances, and may transmit corresponding configuration information to a UE through higher layer signaling and/or downlink control information.

In this case, for multiplexing between UEs, the number of DMRS REs configuring the aggregated REG and a sequence (e.g., Zadoff-Chu sequence) of a length suitable for data REs, and a computer-generated sequence may be applied to the REs of the aggregated REG unit.

Furthermore, the number of aggregated REGs, a bandwidth in which the aggregated REGs are distributed and located and/or a configuration related to the interval between the aggregated REGs may be applied using the same method as the case of the above-described REG unit.

Furthermore, since coverage level of a UE may be different, a range occupied by an REG unit on a time domain may be different. For example, in the case of a UE having small coverage, the length of a time domain in which an REG unit is configured may be set longer than that of a UE having great coverage. Accordingly, the above-described REG unit may be expanded to a two-dimension in addition to one-dimensional expansion. The two-dimensional expansion of an REG unit is described with reference to FIG. 10.

Figure 10:
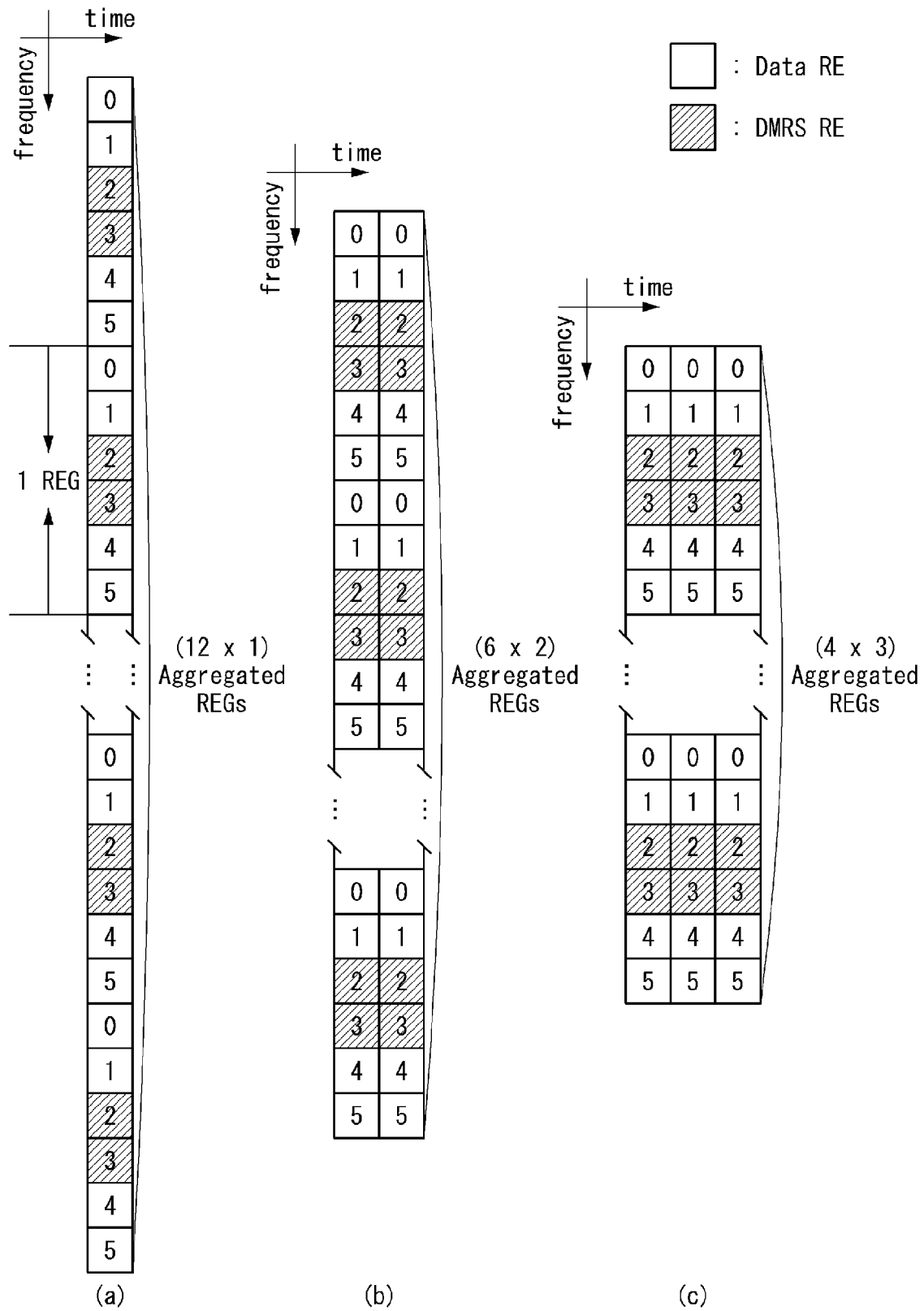
FIG. 10 illustrates examples of two-dimensional structures of REG units to which a method proposed in this specification may be applied.

FIG. 10 illustrates examples of two-dimensional structures of REG units to which a method proposed in this specification may be applied. FIG. 10 is for only convenience of description and does not limit the scope of the present invention.

Referring to FIG. 10, a case where a UE configures an uplink control channel in a total of 12 REG units, each unit including 6 REs, distributes and/or assigns the REGs so that they are located contiguously on a frequency band, and transmits them through 1 symbol is assumed. In this case, the REG units may be located contiguously and/or may be distributed in a time axis in addition to a frequency axis. In this case, REGs that are located contiguously and/or distributed in the time axis may be considered as a new REG unit (i.e., aggregated REG).

For example, as in FIG. 10(a), 12 REGs may be located in a row in a frequency band and may be configured with aggregated REGs (i.e., 12×1 aggregated REGs). Alternatively, as in FIG. 10(b), 12 REGs may be configured by arranging two REGs in a connected and/or distributed (or isolated) ways in the time axis. Such six structures may be located in such a way as to be connected and/or distributed in the frequency axis. Alternatively, as in FIG. 10(c), a structure in which three REGs are allocated in the time axis may be considered. In this case, the aggregated REG unit may be expanded and configured in several symbol units.

In this case, the ratio of DMRS REs and data REs and/or a mapping method in an REG unit configured in a two-dimensional way may be configured in various ways based on a degree (or level) of time/frequency selectivity based on the mobility of a UE, a multiplexing capability and/or the characteristics of a sequence applied for multiplexing.

In this case, a base station may transmit configuration information about the two-dimensional configuration of an REG unit, such as that described above, to a UE through higher layer signaling and/or downlink control information.

Furthermore, in addition to the above-described contents, a configuration method of a resource for configuring a physical uplink control channel (PUCCH) on a system may be considered. If a PUCCH resource is configured, the PUCCH resource may include contiguous frequency resources according to a localized method in order to satisfy a single carrier property (or by considering the PAPR). Alternatively, the PUCCH resource may have a distributed type for a frequency diversity effect.

In this case, which mapping method of a localized type and distributed type will be used for PUCCH transmission may be configured with respect to a UE through higher layer signaling (e.g., RRC signaling). In this case, a PUCCH mapping method independent (or different) for each PUCCH format may be configured with respect to one UE. Alternatively, the same PUCCH mapping method may be configured with respect to all PUCCH formats configured with respect to the same UE. In this case, the PUCCH format may be a format according to one symbol and time duration, such as short duration or long duration or may be a format according to a transmission use, such as HARQ-ACK, channel state information (CSI) and/or a scheduling request (SR).

Furthermore, in the case of specific uplink control information (e.g., HARQ-ACK), a plurality of PUCCH resource candidates may be previously configured through higher layer signaling (e.g., RRC signaling). In this case, one of the plurality of PUCCH resource candidates may be indicated as a PUCCH transmission resource for specific uplink control information through downlink control information (DCI) (e.g., a downlink grant). For example, if a plurality of PUCCH resource candidates previously configured through higher layer signaling (e.g., RRC signaling) includes a PUCCH resource of a localized mapping method and a PUCCH resource of a distributed mapping method, what a PUCCH transmission resource for specific uplink control information is configured according to which mapping method may be indicated dynamically (i.e., through DCI or an MAC CE). Alternatively, in the case of specific uplink control information, all of a plurality of previously configured PUCCH resource candidates may be limited to support only the same mapping method.

Through a method, such as that described above, a UE may transmit uplink control information to a base station using an adaptively configured REG unit.

Second Embodiment—Uplink Control Channel Region of Plurality of Symbol Units

However, the structure of an uplink control channel region of 1 symbol unit (first embodiment), such as that described above, includes a small number of symbols, but may have a disadvantageous characteristic with respect to a UE having low coverage due to insufficient energy. Accordingly, a structure in which an uplink control channel is configured in a plurality of symbols for UEs having low coverage needs to be considered. For example, a structure in which an uplink control channel is subjected to frequency division multiplexing (FDM) along with an uplink data channel may be considered. For convenience of description, the following methods have been illustrated as being applied to a structure in which an uplink control channel and an uplink data channel are subjected to FDM, but may be applied to a case where an uplink control channel is configured in several symbols as a TDM structure not the FDM structure.

Figure 11:
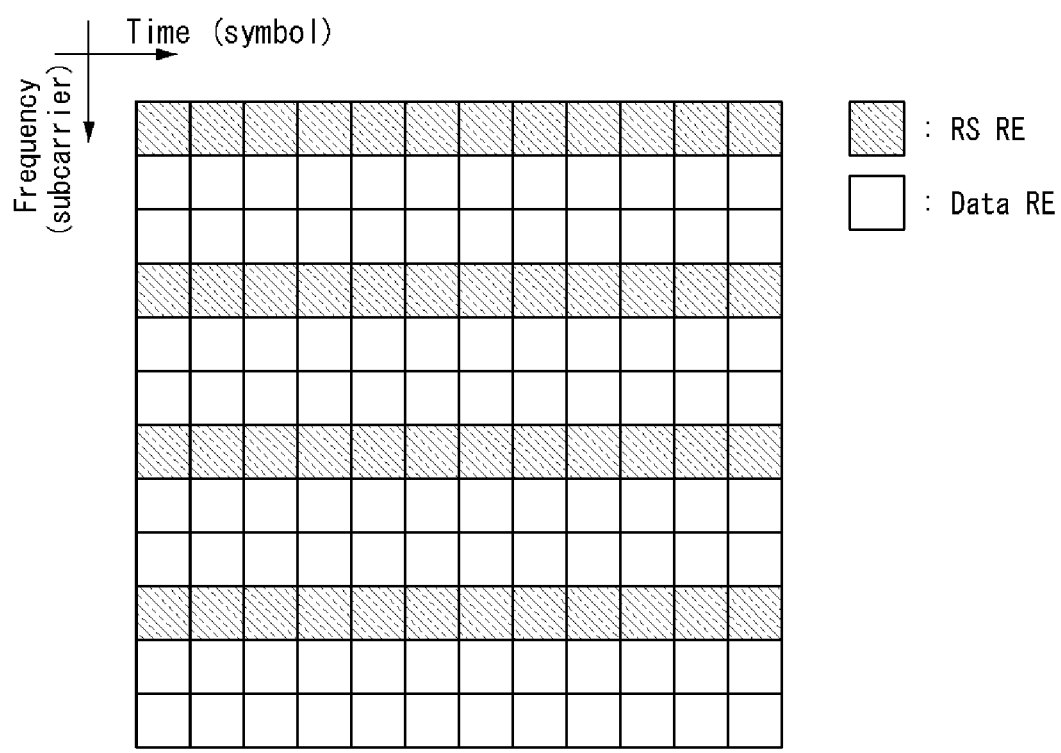
FIG. 11 illustrates an example of the configuration of an uplink control channel of an FDM scheme to which a method proposed in this specification may be applied.

An uplink control channel of an FDM scheme which may be applied to an OFDM numerology considered in the NR system may be configured like FIG. 11.

FIG. 11 illustrates an example of the configuration of an uplink control channel of an FDM scheme to which a method proposed in this specification may be applied.

FIG. 11 is for only convenience of description and does not limit the scope of the present invention.

Referring to FIG. 11, a case where an uplink control channel region includes an RE (e.g., DMRS RE) for a reference signal (RS) and a data RE and the RS RE and the data RE are configured as a comb structure in the direction of a frequency axis.

In this case, a pseudo random sequence may be applied to the RE, and a scrambling sequence may be additionally applied. In this case, the ratio of RS REs and data REs may be set as 1:K (K is a value of 1 or more) in various ways. For example, in the case of FIG. 11, the ratio of RS REs and data REs is 1:2. In such a structure, multiplexing performance between UEs can be improved because an orthogonal cover code (OCC) is applied in the time axis.

FIG. 12 illustrates examples in which an orthogonal cover code (OCC) is applied to an uplink control region to which a method proposed in this specification may be applied. FIG. 12 is for only convenience of description and does not limit the scope of the present invention.

Referring to FIG. 12, in order to improve multiplexing performance between UEs, a case where an orthogonal cover code (OCC) is applied to an uplink control channel region in a time axis is assumed.

FIG. 12(a) illustrates a configuration in which an OCC of a length 12 (length-12 OCC) is applied to RS REs and data REs in a subcarrier unit based on the number of symbols configuring an uplink control channel. In this case, if a UE modulates data (i.e., uplink control information (UCI)) according to a quadrature phase shift keying (QPSK) method, each of a total of 12 UEs may transmit 20 bits.

In this case, the length of the OCC may be set in various ways based on a multiplexing capability and/or the number of bits to be transmitted. FIG. 12(b) illustrates a configuration in which two OCCs of a length 6 (length-6 OCC) are applied to RS REs and data REs in a subcarrier unit in the direction of a time axis. In this case, compared to FIG. 12(a), in FIG. 12(b), each of 6 different UEs may transmit 40 bits because the two OCCs of a length 6 are applied in the time axis. That is, the number of multiplexed UEs is reduced by half, but the number of bits transmitted by each UE is doubly increased.

In this case, the ratio of RS REs and data REs and/or the positions where the RS RE and the data RE are mapped in a subcarrier unit may be configured in various ways. Furthermore, a structure in which UEs are subjected to time division multiplexing (TDM) in each symbol unit without applying an OCC, such as that described above, may be considered. Alternatively, a structure in which a TDM scheme is applied to an RS RE and an OCC in the time axis is applied to a data RE may be considered. Furthermore, in an OCC application method proposed in the present invention, a phase shift may be additionally applied in order to reduce the PAPR.

Furthermore, in this case, a base station may notify a UE of configuration information about the ratio of RSs and data (i.e., the ratio of RS REs and data REs), a method of mapping RS REs and data REs, the length of an OCC, the number of bits transmitted by a UE and/or multiplexing capability through higher layer signaling and/or downlink control information (DCI).

Alternatively, unlike the above-described method, a method of applying an OCC to an RS RE in the time axis and applying an OCC to a data RE in the frequency axis may be considered.

Figure 13:
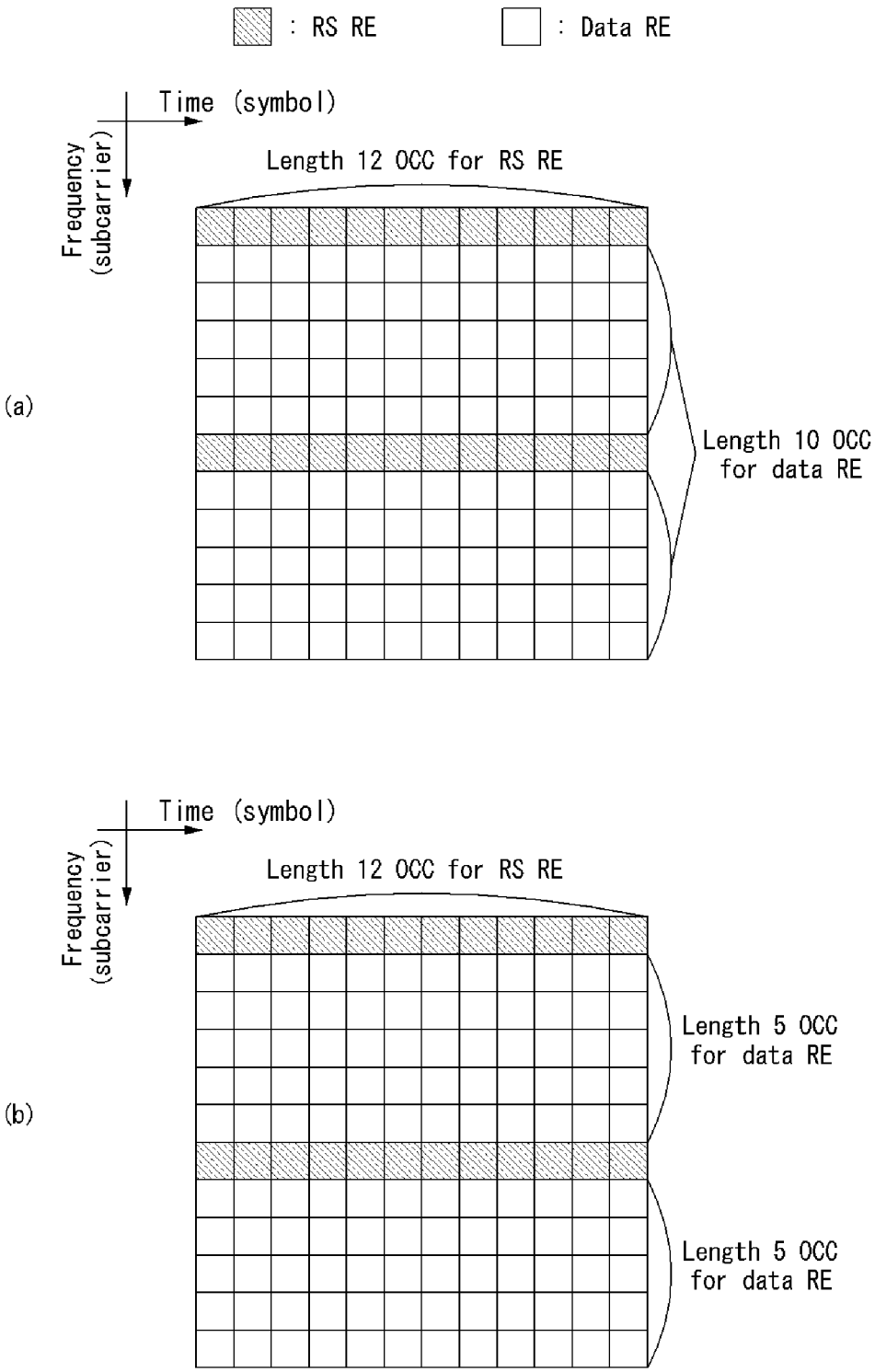
FIG. 13 illustrates other examples in which an orthogonal cover code (OCC) is applied to an uplink control region to which a method proposed in this specification may be applied.

FIG. 13 illustrates other examples in which an orthogonal cover code (OCC) is applied to an uplink control region to which a method proposed in this specification may be applied. FIG. 13 is for only convenience of description and does not limit the scope of the present invention.

Referring to FIG. 13, in order to improve multiplexing performance between UEs, a case where an OCC is applied to the RS REs of an uplink control channel region in a time axis and an OCC is applied to data REs in a frequency axis is assumed.

In this case, as in FIG. 13(a), an OCC of a length 12 (length-12 OCC) may be applied to the RS REs based on the number of symbols configuring an uplink control channel, and an OCC of a length 10 (length-10 OCC) may be applied to the data REs based on the number of subcarriers. In this case, a maximum of 10 UEs may be multiplexed. If each UE modulates data (i.e., uplink control information (UCI)) using a QPSK method, each of a total of 10 UEs may transmit 24 bits (24 bits=2 bits×12 symbols).

In this case, the length of the OCC may be set in various ways based on the ratio of RS REs and data REs, a multiplexing capability and/or the number of bits to be transmitted. FIG. 13(b) illustrates a configuration in which two OCCs of a length 5 (length-5 OCC) are applied to data REs in the direction of a frequency axis. In this case, in FIG. 13(b), a maximum of 5 UEs may be multiplexed because the two OCCs of a length 5 are applied in the frequency axis compared to FIG. 13(a). Each of a total of the 5 UEs may transmit 48 bits (48 bits=2 bits×2 OCC groups×12 symbols). That is, the number of multiplexed UEs is reduced by half, but the number of bits transmitted by each UE is doubly increased.

In this case, two OCCs of a length 6 may be applied to the RS REs instead of an OCC of a length 12. The ratio of RS REs and data REs and/or the positions where the RS REs and the data REs are mapped in a subcarrier unit may be configured in various ways.

Alternatively, unlike the above-described method, a method of applying an OCC to both an RS RE and a data RE in the frequency axis may be considered.

Figure 14:
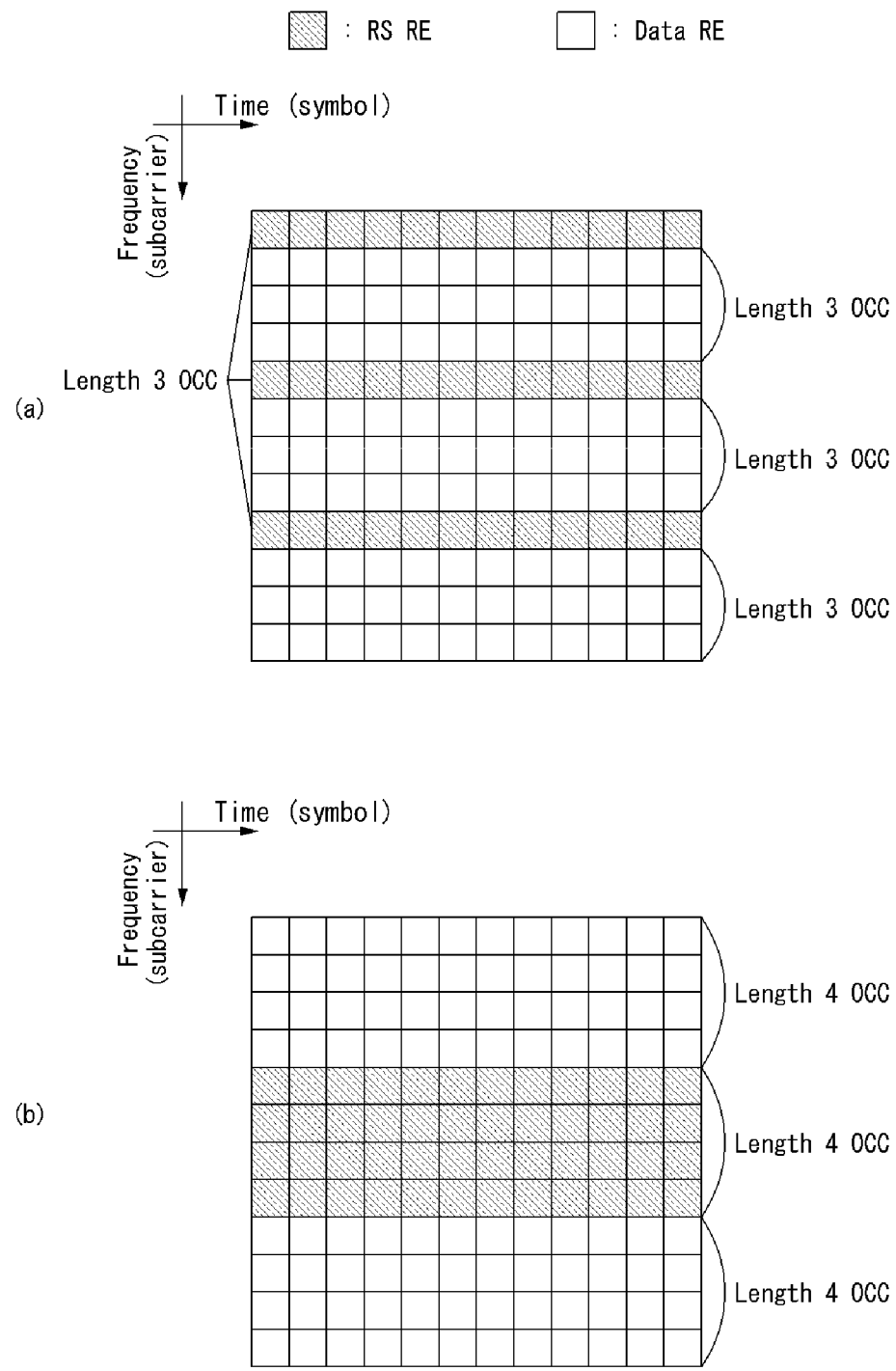
FIG. 14 illustrates other examples in which an orthogonal cover code (OCC) is applied to an uplink control region to which a method proposed in this specification may be applied.

FIG. 14 illustrates other examples in which an orthogonal cover code (OCC) is applied to an uplink control region to which a method proposed in this specification may be applied. FIG. 14 is for only convenience of description and does not limit the scope of the present invention.

Referring to FIG. 14, a case where OCCs are applied to the RS REs and data REs of an uplink control channel region in a frequency axis in order to improve multiplexing performance between UEs is assumed.

In the structure of RS REs and data REs, such as FIG. 14(a), OCCs may be applied to the RS REs and the data REs in a symbol unit. In this case, an OCC of a length 3 may be applied to the RS REs, and an OCC of a length 3 may be applied to the data REs in a 3-subcarrier unit. Accordingly, three different UEs may be multiplexed.

In this case, a structure in which RS REs are configured to be located contiguously may be considered by considering orthogonality between OCCs, as in FIG. 14(b). In this case, an OCC of a length 4 may be applied to the RS REs in a frequency axis, and OCCs of a length 4 may be applied to data REs.

In this case, the positions where the RS REs and the data REs are mapped in a subcarrier unit may be configured in various ways. Furthermore, the ratio of the RS REs and the data REs and/or the length of the OCC may be configured in various ways based on the number of bits transmitted by a UE and/or a multiplexing capability.

Figure 15:
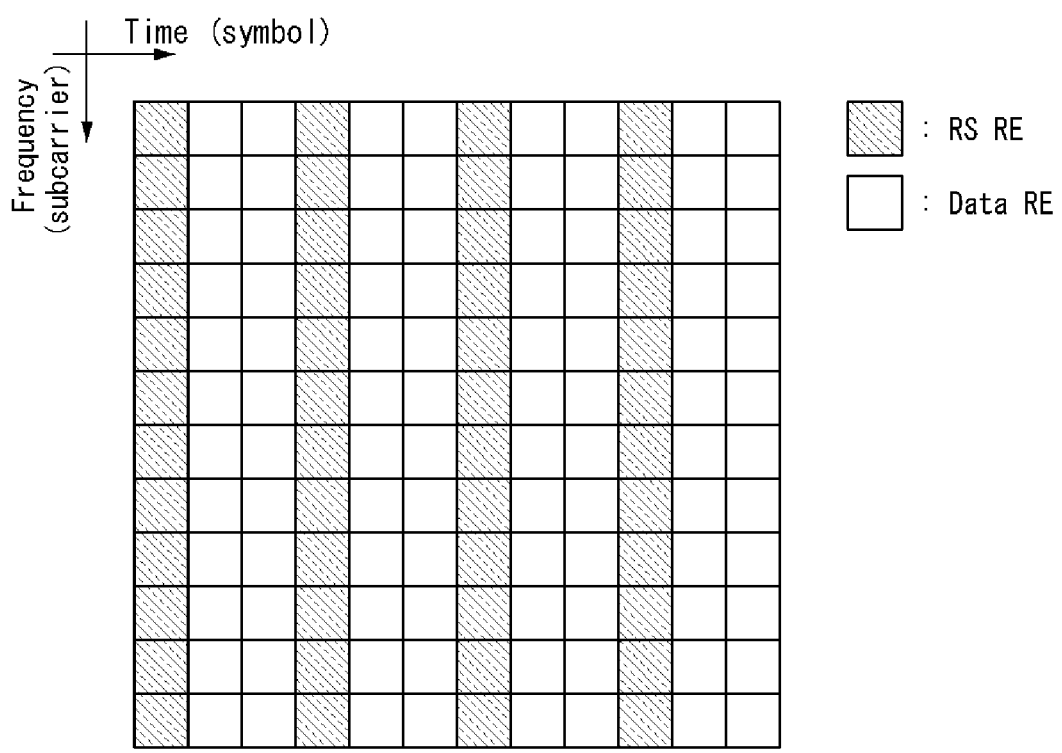
FIG. 15 illustrates another example of the configuration of an uplink control channel of an FDM scheme to which a method proposed in the present invention may be applied.

Furthermore, unlike in the above description, as in FIG. 15, RS REs may be lengthily configured in a frequency axis. If RS REs are lengthily configured in a time axis, the RS REs are subjected to FDM with data REs in one symbol viewpoint, so the PAPR increases. In contrast, a structure in which RS REs are lengthily configured in the frequency axis has an advantage in that it can have a relatively low PAPR characteristic because only the RS REs are mapped to one symbol. Furthermore, an additional effect can be obtained in the PAPR aspect because a sequence (e.g., a Zadoff-Chu sequence) having a low PAPR characteristic is mapped to RS REs lengthily configured in the frequency axis.

FIG. 15 illustrates another example of the configuration of an uplink control channel of an FDM scheme to which a method proposed in the present invention may be applied. FIG. 15 is for only convenience of description and does not limit the scope of the present invention.

Referring to FIG. 15, a case where an uplink control channel region may include RS REs and data REs and the RS REs are configured to be located contiguously in the frequency axis is assumed.

In this case, in relation to OCC application methods corresponding to a case where the above-described RS REs are lengthily configured in the time axis, the above-described OCC application methods may be partially changed and applied. That is, in the above-described OCC application methods, a time axis OCC may be changed into a frequency axis OCC and a frequency axis OCC may be changed into a time axis OCC, and the above-described OCC application methods may be applied to a case where RS REs are lengthily configured in the frequency axis without any change.

Specifically, cases where the above-described OCC methods are applied are described with reference to the following drawings.

FIG. 16 illustrates other examples in which an orthogonal cover code (OCC) is applied to an uplink control region to which a method proposed in this specification may be applied. FIG. 16 is for only convenience of description and does not limit the scope of the present invention.

Referring to FIG. 16, a case where RS REs are lengthily located in a frequency axis compared to FIG. 12 is assumed. In this case, in order to improve multiplexing performance between UEs, an orthogonal cover code (OCC) is applied to an uplink control channel region in the frequency axis.

As in FIG. 16(a), an OCC of a length 12 (length-12 OCC) corresponding to the number of subcarriers configuring an uplink control channel may be applied to RS REs and data REs in a symbol unit. In this case, if a UE modulates data (i.e., uplink control information (UCI)) using a quadrature phase shift keying (QPSK) method, each of a total of 12 UEs may transmit 20 bits. Furthermore, in this case, a Zadoff-Chu sequence or computer-generated sequence of a length 12 may be applied instead of an OCC may be applied to the RS REs.

In this case, the length of the OCC may be set in various ways based on a multiplexing capability and/or the number of bits to be transmitted. That is, as in FIG. 16(b), two OCCs of a length 6 (length-6 OCC) may be applied to RS REs and data REs in a symbol unit in the direction of the frequency axis. In this case, compared to FIG. 16(a), in FIG. 16(b), each of six different UEs may transmit 40 bits because the two OCCs of a length 6 are applied in the frequency axis. That is, the number of multiplexed UEs is reduced by half, but the number of bits transmitted by each UE is doubly increased. Furthermore, in this case, a Zadoff-Chu sequence or computer-generated sequence of a length 6 instead of an OCC may be applied to the RS REs.

In this case, a structure in which frequency division multiplexing (FDM) between UEs in each subframe unit may be considered without applying an OCC, such as that described above. Alternatively, a structure in which an FDM scheme is applied to the RS REs and an OCC in the time axis is applied to the data REs may be considered.

Furthermore, in this case, a base station may notify a UE of configuration information about the ratio of RSs and data (i.e., the ratio of RS REs and data REs), a method of mapping RS REs and data REs, the length of an OCC, the number of bits transmitted by a UE and/or a multiplexing capability through higher layer signaling and/or downlink control information (DCI).

Furthermore, unlike the above-described method, a method of applying an OCC to RS REs in a frequency axis and applying an OCC to data REs in a time axis may be considered.

Figure 17:
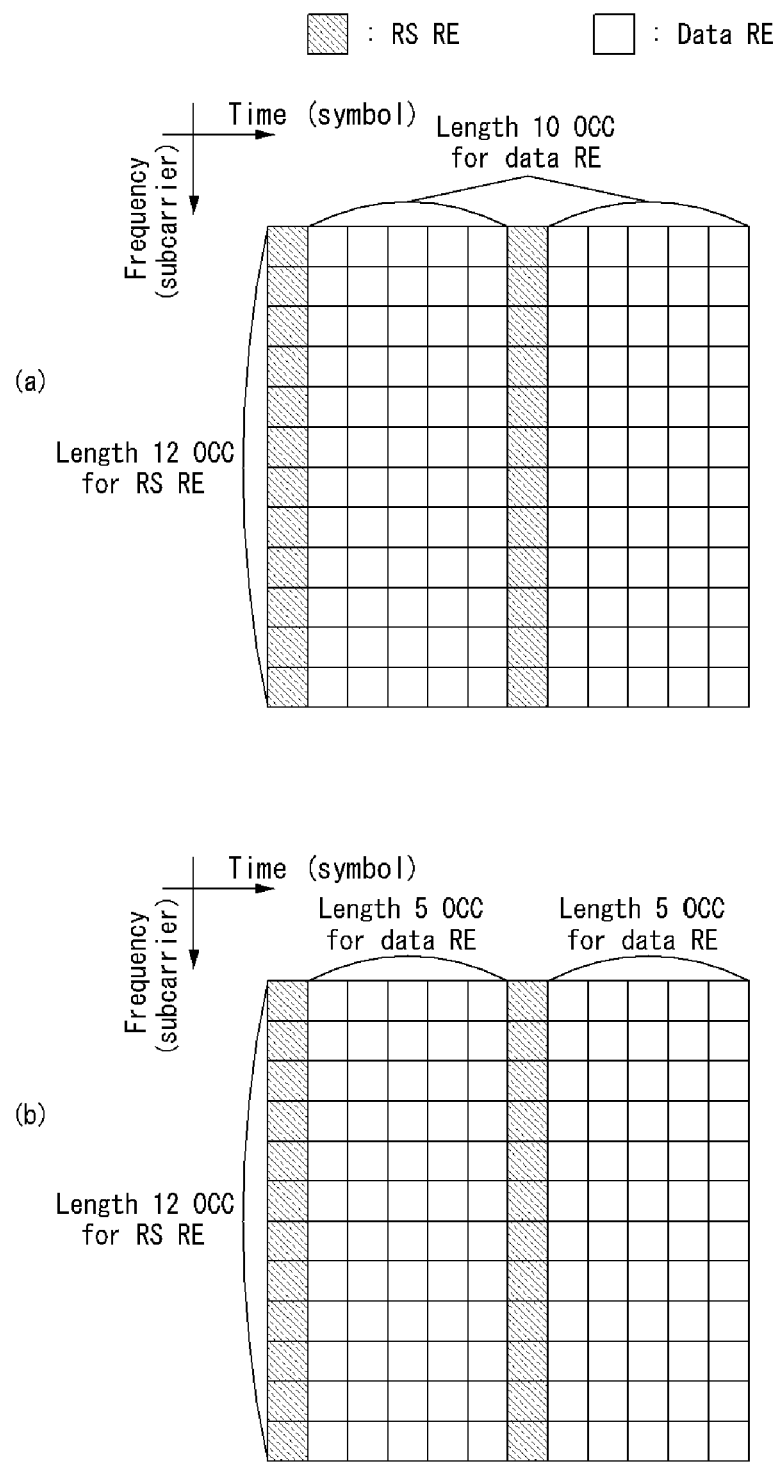
FIG. 17 illustrates other examples in which an orthogonal cover code (OCC) is applied to an uplink control region to which a method proposed in this specification may be applied.

FIG. 17 illustrates other examples in which an orthogonal cover code (OCC) is applied to an uplink control region to which a method proposed in this specification may be applied. FIG. 17 is for only convenience of description and does not limit the scope of the present invention.

Referring to FIG. 17, a case where an OCC is applied to the RS REs of an uplink control channel region in a frequency axis and an OCC is applied to data REs in a time axis in order to improve multiplexing performance between UEs is assumed.

In this case, as in FIG. 17(a), an OCC of a length 12 (length-12 OCC) may be applied to RS REs based on the number of subcarriers configuring an uplink control channel, and an OCC of a length 10 (length-10 OCC) may be applied to data REs based on the number of symbols. In this case, a maximum of 10 UEs may be multiplexed. If each UE modulates data (i.e., uplink control information (UCI)) using a QPSK method, each of a total of 10 UEs may transmit 24 bits (24 bits=2 bits×12 symbols). Furthermore, in this case, a Zadoff-Chu sequence or computer-generated sequence of a length 12 may be applied to the RS REs instead of an OCC.

In this case, the length of the OCC may be set in various ways based on the ratio of RS REs and data REs, a multiplexing capability and/or the number of bits to be transmitted. FIG. 17(b) illustrates a configuration in which two OCCs of a length 5 (length-5 OCC) are applied to the data REs in the direction of a time axis. In this case, compared to FIG. 17(a), in FIG. 17(b), a maximum of 5 UEs may be multiplexed because the two OCCs of a length 5 are applied in the frequency axis, and each of a total of 5 UEs may transmit 48 bits (48 bits=2 bits×2 OCC groups×12 symbols). That is, the number of multiplexed UEs is reduced by half, but the number of bits transmitted by each UE-L is doubly increased.

In this case, two OCCs of a length 6 may be applied to the RS REs instead of the OCC of a length 12, and the ratio of RS REs and data REs and/or the positions where the RS REs and the data REs are mapped in a subcarrier unit may be configured in various ways. Furthermore, a Zadoff-Chu sequence or a computer-generated sequence of a length 6 may be applied to the RS REs instead of the OCC.

Furthermore, unlike the above-described method, a method of applying an OCC to all RS REs and data REs in the time axis may be considered.

Figure 18:
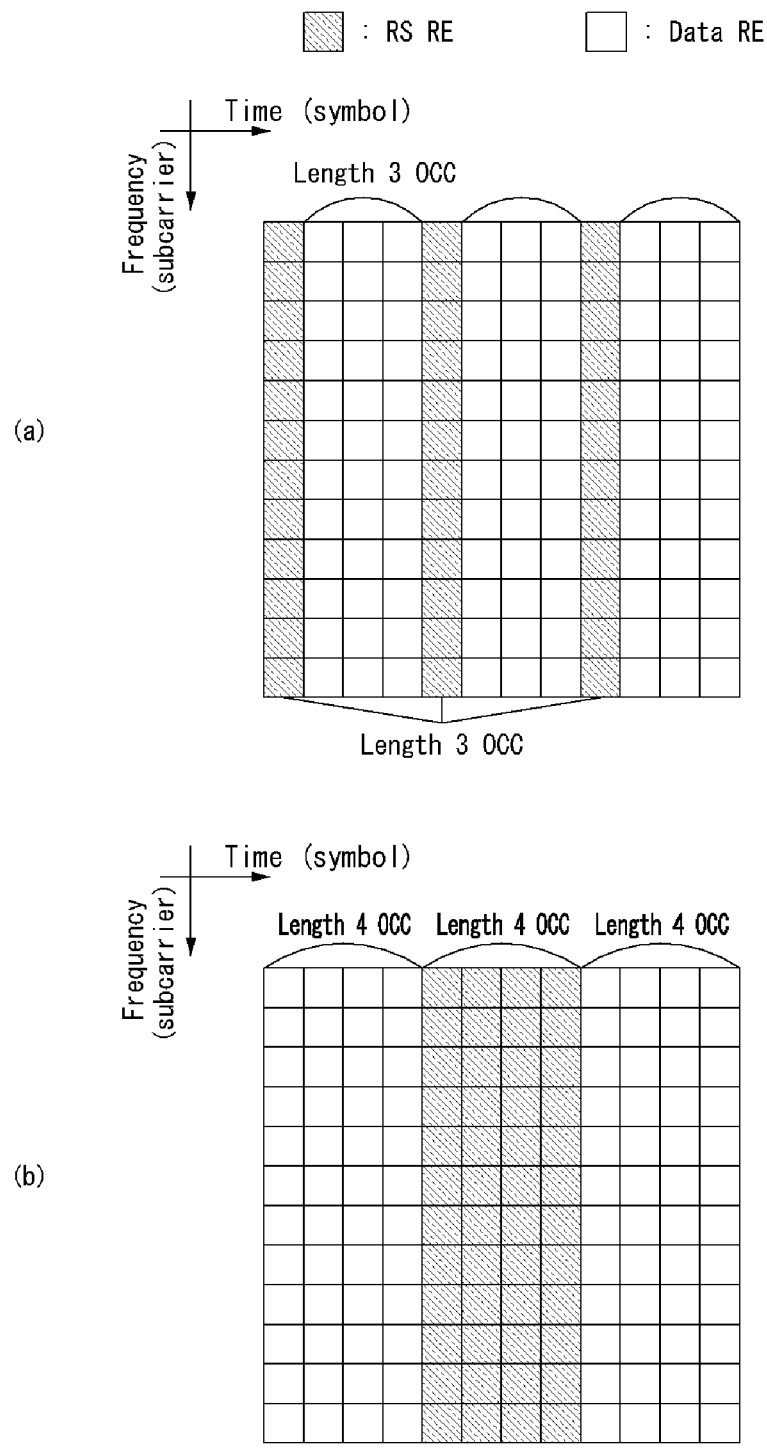
FIG. 18 illustrates other examples in which an orthogonal cover code (OCC) is applied to an uplink control region to which a method proposed in this specification may be applied.

FIG. 18 illustrates other examples in which an orthogonal cover code (OCC) is applied to an uplink control region to which a method proposed in this specification may be applied. FIG. 18 is for only convenience of description and does not limit the scope of the present invention.

Referring to FIG. 18, a case where OCCs are applied to the RS REs and data REs of an uplink control channel region in a time axis in order to improve multiplexing performance between UEs is assumed.

In the structure of RS REs and data REs, such as FIG. 18(a), OCCs may be applied to the RS REs and the data REs in a subcarrier unit. In this case, an OCC of a length 3 may be applied to the RS REs, and an OCC of a length 3 may be applied to the data REs in a three-symbol unit. Accordingly, three different UEs may be multiplexed.

In this case, a structure in which RS REs are configured to be located contiguously as in FIG. 18(b) by considering orthogonality between OCCs may be considered. In this case, an OCC of a length 4 may be applied to the RS REs in the time axis, and OCCs of a length 4 may be applied to the data REs.

In this case, the positions where the RS REs and the data REs are mapped in a subcarrier unit may be configured in various ways. Furthermore, the ratio of the RS REs and the data REs and/or the length of the OCC may be configured in various ways based on the number of bits transmitted by a UE and/or a multiplexing capability.

Furthermore, if RS REs are lengthily located in a frequency axis and an uplink control channel is configured according to an FDM scheme, a configuration in which an RS and a phase compensation RS (PCRS) are used together may be considered. In particular, a system supporting a high frequency band (e.g., above 6 GHz) can have an advantage in that a phase can be correctly adjusted through a configuration using a PCRS because the phase may greatly time-vary. In this case, as in FIG. 29, a method of mapping a PCRS without reducing the number of symbols in which an RS is transmitted may be considered.

Figure 19:
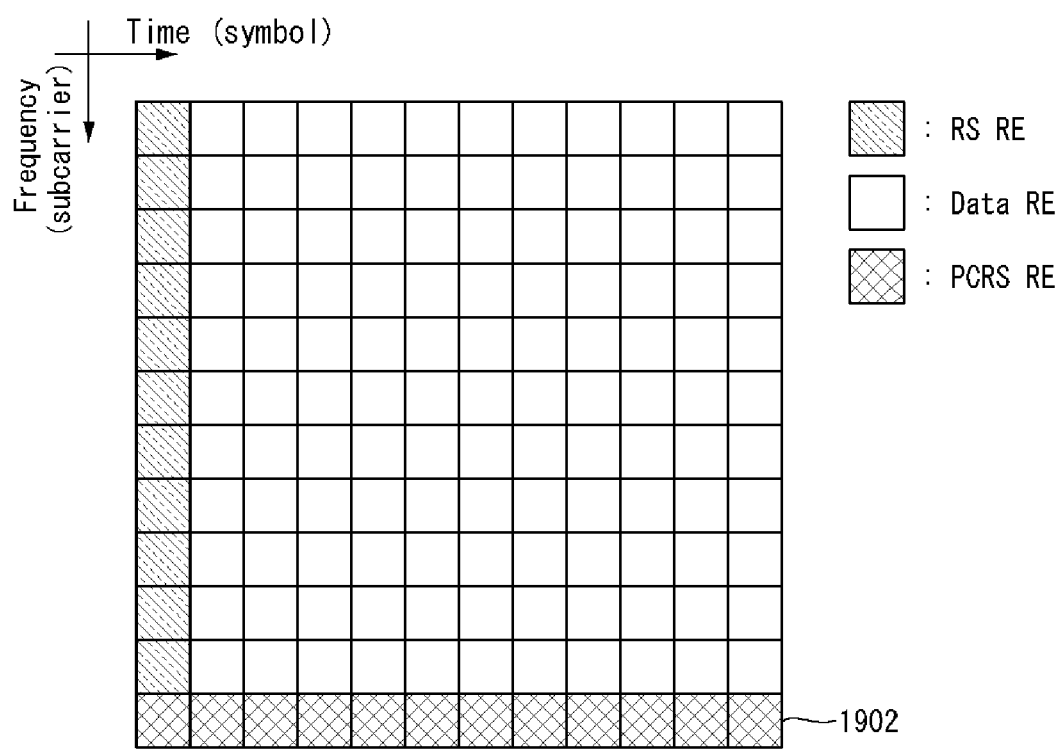
FIG. 19 illustrates an example of a resource region for uplink control channel transmission to which a method proposed in this specification may be applied.

FIG. 19 illustrates an example of a resource region for uplink control channel transmission to which a method proposed in this specification may be applied. FIG. 19 is for only convenience of description and does not limit the scope of the present invention.

Referring to FIG. 19, a case where a phase compensation RS (PCRS) 1902 is connected and mapped in the specific subcarriers of an uplink control channel region in a time axis is assumed. In this case, the number of symbols used for the transmission of an RS, the number of subcarriers used for the transmission of the PCRS and/or a mapping method between the RS and the PCRS may be configured in various ways. Furthermore, for multiplexing between UEs, the above-described OCC application method may be applied identically.

For example, in a structure, such as FIG. 19, a method of applying an OCC of a length 11 to RS REs and data REs in a frequency axis or applying an OCC of a length 11 to the RS REs in the frequency axis and applying an OCC of a length 11 to the data REs in a time axis may be applied. In this case, if the RS is configured in two symbols, two OCCs of a length 5 may be applied to the data REs (i.e., data region) as described above.

Furthermore, in the above-described methods, multiplexing may be performed according to an FDM scheme instead of a method of applying an OCC.

Furthermore, a Zadoff-Chu sequence of a length 11 may be applied instead of an OCC of a length 11 by considering a peak-to-average power ratio (PAPR). In this case, information mapped to a PCRS RE may be determined by considering PAPR performance.

Furthermore, if a plurality of UEs needs to be supported at the same time in an NR system (e.g., in the case of a massive machine type communication (mMTC) service), RS REs configuring an uplink control channel may be isolated and located based on a degree of time/frequency selectivity based on the mobility of a UE.

Figure 20:
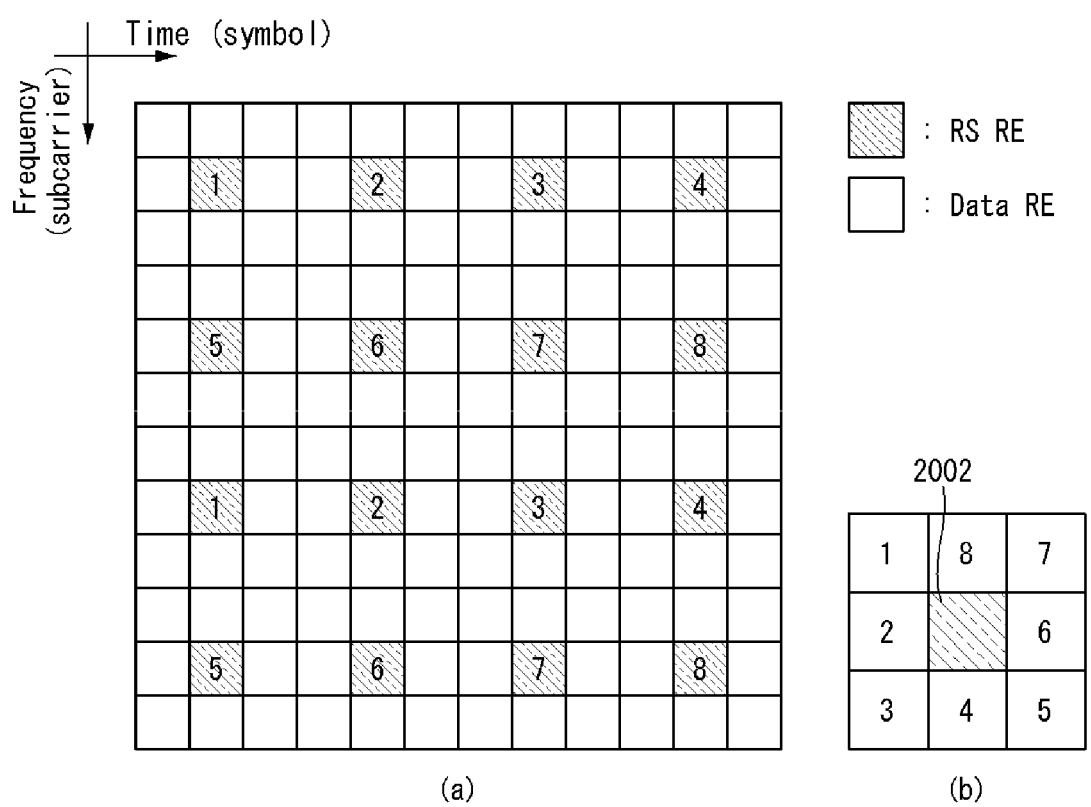
FIG. 20 illustrates another example of a resource region for uplink control channel transmission to which a method proposed in this specification may be applied.

FIG. 20 illustrates another example of a resource region for uplink control channel transmission to which a method proposed in this specification may be applied. FIG. 20 is for only convenience of description and does not limit the scope of the present invention.

Referring to FIG. 20, a case where REs to which a reference signal is mapped, that is, RS REs are isolatedly located is assumed. That is, in an uplink control channel region, RS REs may be isolatedly located at a specific subcarrier interval and/or a specific symbol interval. In this case, FIG. 20(a) illustrates an example of an OCC application for isolatedly located RS REs, and FIG. 20(b) illustrates an example of an OCC application for data REs located contiguously isolatedly located RS REs.

In order to perform multiplexing between UEs, a plurality of isolatedly located RS REs needs to be configured as one unit. For example, if multiplexing for a maximum of 8 UEs is necessary, the RS REs of an uplink control channel region may be grouped in an 8 unit. That is, as shown in FIG. 20(*a*), a UE may repeatedly perform mapping on RS REs of an 8 unit with respect to 16 RS REs. In this case, for classification between the RS REs, an OCC of a length 8 may be applied to a first RS RE (i.e., the first RS RE of the RS REs of an 8 unit) to an eighth RS RE (i.e., the eighth RS RE of the RS REs of an 8 unit). Furthermore, a scrambling sequence using the identifier (ID) of a UE in addition to a method of applying an OCC to RS REs may be applied to the RS REs.

Additionally, in relation to an OCC application to data REs, a method for a UE to apply an OCC to data REs within a region satisfying a coherence bandwidth and time interval of a specific criterion on the basis of an RS RE may be considered. Specifically, as in FIG. 20(*b*), an OCC of a length 8 may be applied to 8 data REs around an RS RE 2002. That is, FIG. 20(*b*) may mean a basic unit of an OCC application to data REs if the RS RE has been isolatedly located. In this case, the RS RE 2002 may mean one of the 16 RS REs of FIG. 20(*a*).

In this case, an OCC of a length 8 may be applied to the 8 data REs located to the RS RE 2002 in such a way as to be located contiguously clockwise or counterclockwise. In other words, a two-dimensional OCC of a form in which a time axis OCC and a frequency axis OCC have been combined may be applied to the data REs present around the RS RE. In this case, a base station may deliver configuration information about starting point (e.g., "1" of FIG. 20(*b*)) of the two-dimensional OCC and/or the application direction of the two-dimensional OCC to a UE through higher layer signaling and/or downlink control information (DCI). Furthermore, the configuration information about the starting point of the two-dimensional OCC and/or the application direction of the two-dimensional OCC may be previously defined (or configured) on a system.

Furthermore, the number of times that the basic unit of FIG. 20(*b*) is repeatedly mapped is different based on the number of multiplexed UEs. For example, as described above, in order to multiplex 8 UEs, the corresponding basic unit may be applied as an 8-RS RE unit. In contrast, in order to multiplex 4 or 2 UEs, the corresponding basic unit needs to be repeatedly applied in a 4-RS RE unit or a 2-RS RE unit. In this case, a method of applying an OCC of a length 8 to eight data REs around an RS RE, but performing multiplexing between UEs using only an orthogonal sequence suitable for the number of UEs may be considered.

As described above, since the two-dimensional OCC is performed on the data REs, although the RS REs of an uplink control channel region are isolatedly located, an OCC application optimized for REs, that is, optimized multiplexing, can be performed. Furthermore, there is an advantage in that an RS ratio in the uplink control channel region can be reduced because RSs are isolatedly mapped to the uplink control channel region.

Figure 21:
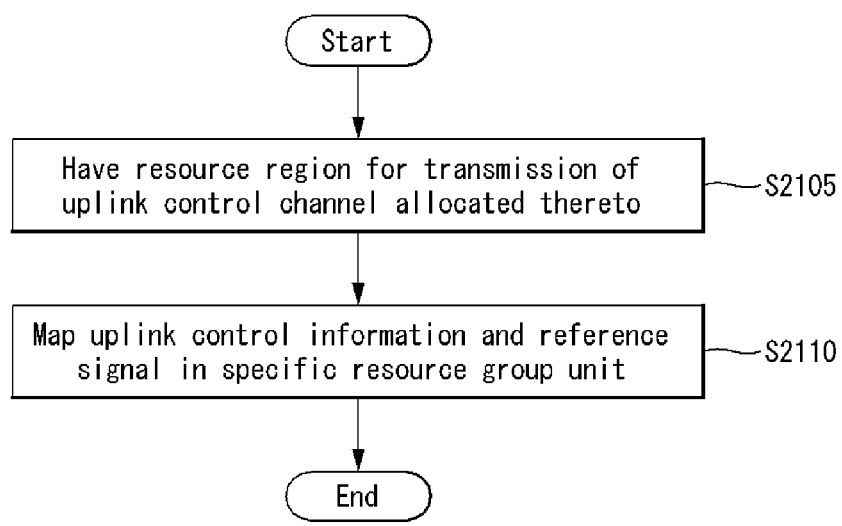
FIG. 21 illustrates an operating flowchart of a user equipment for configuring an uplink control channel to which a method proposed in this specification may be applied.

FIG. 21 illustrates an operating flowchart of a user equipment for configuring an uplink control channel to which a method proposed in this specification may be applied. FIG. 21 is for only convenience of description and does not limit the scope of the present invention.

Referring to FIG. 21, a case where a UE has a resource region for the transmission of an uplink control channel allocated by a base station and maps uplink information and a signal to the allocated resource region is assumed. In this case, the UE may configure the uplink control channel region, such as that described in FIG. 20.

At step S2105, the UE may have a resource region for the transmission of an uplink control channel, allocated thereto.

In this case, the resource region includes one or more symbols. In this case, as described above, the resource region for the transmission of the uplink control channel may be multiplexed with a resource region for the transmission of an uplink data channel according to an FDM scheme or TDM scheme.

After the resource region is allocated to the UE, at step S2110, the UE may map uplink control information and a reference signal to the allocated resource region in a specific resource group unit. In this case, the specific resource group unit may mean a mapping unit for the resource region of the uplink control channel by considering the multiplexing of the UE. That is, the specific resource group unit may mean a basic unit shown in FIG. 20(*b*).

In this case, the specific resource group unit includes a first resource element to which a reference signal has been mapped and second resource elements to which at least one piece of uplink control information has been mapped. In this case, the second resource elements mean resource elements located contiguously to the first resource elements. In this case, the second resource elements to which at least one piece of uplink control information has been mapped may mean that the uplink control information to be transmitted by a UE may be mapped to at least one (i.e., some resource elements) of the second resource elements located contiguously to the first resource element.

Furthermore, the second resource elements are multiplexed clockwise or counterclockwise according to an orthogonal cover code (OCC). For example, as shown in FIG. 20(*b*), the second resource elements may be multiplexed by applying the orthogonal cover code counterclockwise. In this case, the orthogonal cover code may be applied using a specific resource element of the second resource elements as a starting point. A UE may receive information about the specific resource element from a base station through higher layer signaling and/or downlink control information (DCI). Furthermore, the length of then orthogonal cover code may be determined based on the number of second resource elements.

Furthermore, the first resource element may include one of one or more resource elements located to an uplink control channel for the transmission of a reference signal in a resource region allocated to the UE. In this case, each of the one or more resource elements may be located at a preset specific subcarrier interval and/or a specific symbol interval between the resource elements. For example, the one or more the resource elements may mean isolatedly located RS REs shown in FIG. 20(*a*).

In this case, the one or more the resource elements may include one or more resource element sets based on the length of the orthogonal cover code applied to the one or more the resource elements. For example, in the case of FIG. 20(*a*), there are two resource element sets including a first RS RE to an eighth RS RE.

Furthermore, referring to FIG. 20(*b*), an index relation between the first resource element and the second resource elements configuring a specific resource group unit mapped to the uplink control channel region may be represented as in the following example. For example, if an index pair of the first resource elements (i.e., RS REs within a specific resource group unit) has (k, l), the index pairs of the second resource elements located contiguously to each other may have (k−1, l−1), (k−1, l), (k−1, l+1), (k, l−1), (k, l+1), (k+1, l−1), (k+1, l), and (K+1, l+1). In this case, the first index of the index pairs means a subcarrier index on a frequency region, and the second index thereof means a symbol index on a time domain.

General Apparatus to which the Present Invention May be Applied

Figure 22:
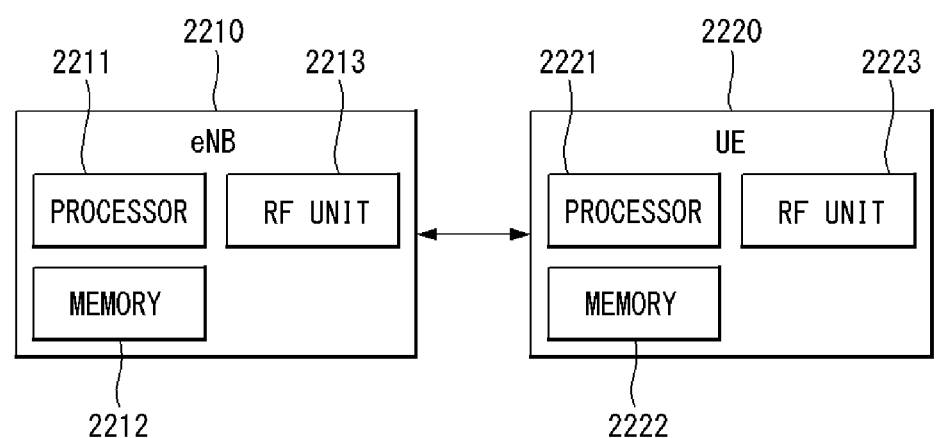
FIG. 22 illustrates a block diagram of a wireless communication apparatus to which methods proposed in this specification may be applied.

FIG. 22 illustrates a block diagram of a wireless communication apparatus to which the methods proposed in this specification may be applied.

Referring to FIG. 22, a wireless communication system includes an eNB 2210 and a plurality of UEs 2220 disposed within the eNB (2210) region.

The eNB 2210 includes a processor 2211, memory 2212 and a radio frequency (RF) unit 2213. The processor 2211 implements the functions, processes and/or methods proposed in FIGS. 1 to 21. The layers of a radio interface protocol may be implemented by the processor 2211. The memory 2212 is connected to the processor 2211, and stores a variety of types of information for driving the processor 2211. The RF unit 2213 is connected to the processor 2211 and transmits and/or receives radio signals.

The UE 2220 includes a processor 2221, memory 2222 and an RF unit 2223.

The processor 2221 implements the functions, processes and/or methods proposed in FIGS. 1 to 21. The layers of a radio interface protocol may be implemented by the processor 2221. The memory 2222 is connected to the processor 2221 and stores a variety of types of information for driving the processor 2221. The RF unit 2223 is connected to the processor 2221 and transmits and/or receives radio signals.

The memory 2212, 2222 may be positioned inside or outside the processor 2211, 2221 and may be connected to the processor 2211, 2221 by various well-known means.

For example, in a wireless communication system supporting low latency service, a UE may include a radio frequency (RF) unit for transmitting and receiving radio signals in order to transmit and receive downlink (DL) data and a processor functionally connected to the RF unit.

Furthermore, the eNB 2210 and/or the UE 2220 may have a single antenna or multiple antennas.

Figure 23:
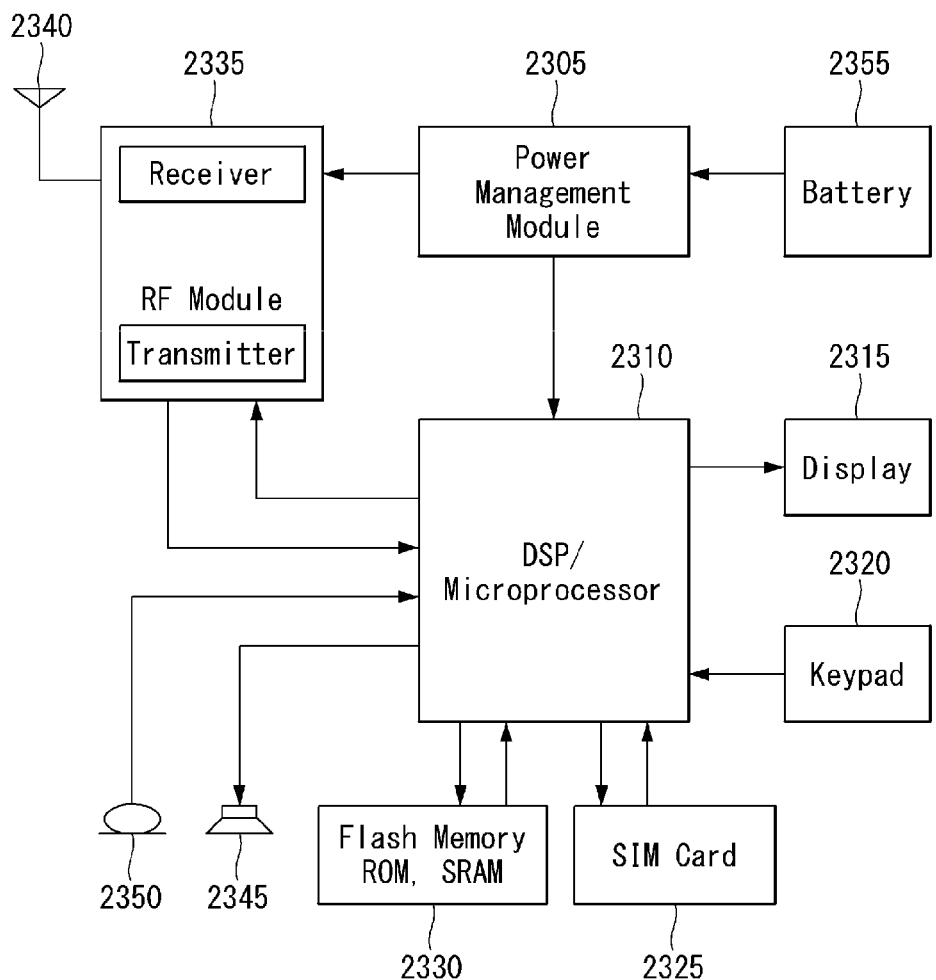
FIG. 23 illustrates a block diagram of a communication apparatus according to an embodiment of the present invention.

FIG. 23 is a block diagram of a communication device according to an embodiment of the present disclosure.

Particularly, FIG. 23 is a diagram illustrating a UE shown in FIG. 22 in more detail.

Referring to FIG. 23, the UE includes a processor (or digital signal processor (DSP)) 2310, an RF module (or RF unit) 2335, a power management module 2305, an antenna 2340, a battery 2355, a display 2315, a keypad 2320, a memory 2330, a subscriber identification module (SIM) card 2325 (optional), a speaker 2345 and a microphone 2350. The UE may include a single antenna or multiple antennas.

The processor 2310 may be configured to implement the functions, procedures and/or methods proposed by the present disclosure as described in FIGS. 1 to 21. Layers of a wireless interface protocol may be implemented by the processor 2310.

The memory 2330 is connected to the processor 2310 and stores information related to operations of the processor 2310. The memory 2330 may be located inside or outside the processor and may be connected to the processors through various well-known means.

A user enters instructional information, such as a telephone number, for example, by pushing the buttons of a keypad 2320 or by voice activation using the microphone 2350. The processor receives and processes the instructional information to perform the appropriate function, such as to dial the telephone number. Operational data may be retrieved from the SIM card 2325 or the memory 2330 to perform the function. Furthermore, the processor may display the instructional and operational information on the display 2315 for the user's reference and convenience.

The RF module 2335 is connected to the processor and transmits and/or receives an RF signal. The processor forwards instructional information to the RF module, to initiate communication, for example, transmits radio signals comprising voice communication data. The RF module includes a receiver and a transmitter to receive and transmit radio signals. An antenna 2340 facilitates the transmission and reception of radio signals. Upon receiving radio signals, the RF module may forward and convert the signals to baseband frequency for processing by the processor. The processed signals may be transformed into audible or readable information outputted via the speaker 2345.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for transmitting an uplink control channel in a wireless communication system of the present invention has been illustrated as being applied to the 3GPP LTE/LTE-A system, a 5G system (New RAT system), but may be applied to various wireless communication systems in addition to them.

What is claimed is:

1. A method for a user equipment to transmit an uplink control channel in a wireless communication system, the method comprising:
   receiving allocation of a resource region configured with one or more symbols for a transmission of an uplink control channel; and
   mapping uplink control information and a reference signal to the allocated resource region in a specific resource group unit,
   wherein the specific resource group unit includes a first resource element to which the reference signal is mapped and second resource elements to which at least one of the uplink control information is mapped,
   wherein the second resource elements are located contiguously to the first resource element, and
   wherein the second resource elements are multiplexed clockwise or counter-clockwise around the first resource element based on an orthogonal cover code.

2. The method of claim 1,
   wherein the first resource element comprises one of one or more resource elements allocated for a transmission of a reference signal for the uplink control channel in the allocated resource region, and
   wherein each of the one or more resource elements is located based on at least one of a specific symbol interval or a specific subcarrier spacing preconfigured between resource elements.

3. The method of claim 2,
   wherein the one or more resource elements are configured with one or more resource element sets based on a length of the orthogonal cover code applied to the one or more resource elements.

4. The method of claim 1,
   wherein the orthogonal cover code is applied using a specific resource element of the second resource elements as a starting point.

5. The method of claim 4, further comprising:
   receiving, from a base station, information indicating the specific resource element via at least one of higher layer signaling or downlink control information.

6. The method of claim 1,
   wherein a length of the orthogonal cover code is determined based on a number of the second resource elements.

7. The method of claim 6,
   wherein if a pair of a subcarrier index and symbol index of the first resource element is (k, l), pairs of subcarrier indices and symbol indices of the second resource elements are configured as (k−1, l−1), (k−1, l), (k−1, l+1), (k, l−1), (k, l+1), (k+1, l−1), (k+1, l), and (k+1, l+1).

8. A user equipment transmitting an uplink control channel in a wireless communication system, comprising:
   a transceiver unit for transmitting and receiving radio signals,
   a processor functionally connected to the transceiver unit,
   wherein the processor controls to:
   receive allocation of a resource region configured with one or more symbols for a transmission of an uplink control channel; and
   map uplink control information and a reference signal to the allocated resource region in a specific resource group unit,
   wherein the specific resource group unit includes a first resource element to which the reference signal is mapped and second resource elements to which at least one of the uplink control information is mapped,
   wherein the second resource elements are located contiguously to the first resource element, and
   wherein the second resource elements are multiplexed clockwise or counter-clockwise around the first resource element based on an orthogonal cover code.

* * * * *